(12) United States Patent
Yamada

(10) Patent No.: US 8,070,222 B2
(45) Date of Patent: Dec. 6, 2011

(54) HEADREST DEVICE FOR ACTIVE HEADREST

(75) Inventor: Nobuo Yamada, Kariya (JP)

(73) Assignee: Nihon Technica Co., Ltd., Kariya-shi, Aichi (JP)

( * ) Notice: Subject to any disclaimer, the term of this patent is extended or adjusted under 35 U.S.C. 154(b) by 255 days.

(21) Appl. No.: 12/257,813

(22) Filed: Oct. 24, 2008

(65) Prior Publication Data

US 2009/0140560 A1 Jun. 4, 2009

(30) Foreign Application Priority Data

Oct. 24, 2007 (JP) ................................ 2007-276980

(51) Int. Cl.
*B60N 2/42* (2006.01)
*B60R 22/28* (2006.01)

(52) U.S. Cl. ..................... 297/216.12; 297/408; 297/410

(58) Field of Classification Search .................... 297/61, 297/216.12, 391, 406, 407, 408, 410
See application file for complete search history.

(56) References Cited

U.S. PATENT DOCUMENTS

| | | | | |
|---|---|---|---|---|
| 6,250,714 | B1 * | 6/2001 | Nakano et al. | 297/216.12 |
| 6,454,356 | B1 | 9/2002 | Yamada | |
| 6,607,242 | B2 * | 8/2003 | Estrada et al. | 297/216.12 |
| 2006/0006709 | A1 * | 1/2006 | Uno et al. | 297/216.12 |
| 2006/0202524 | A1 * | 9/2006 | Yamaguchi | 297/216.12 |
| 2006/0267384 | A1 * | 11/2006 | Fischer et al. | 297/216.12 |

FOREIGN PATENT DOCUMENTS

| | | |
|---|---|---|
| EP | 1690732 A3 | 8/2006 |
| JP | 11-89665 A | 4/1999 |
| JP | 2000-211410 A | 8/2000 |
| JP | 2000-291069 A | 10/2000 |
| JP | 2001-163099 A | 6/2001 |
| JP | 03-475320 B2 | 12/2003 |
| JP | 2005-296266 A | 10/2005 |

OTHER PUBLICATIONS

European Search Report dated Mar. 4, 2009, issued in corresponding European Patent Application No. 05253652.1.
European Office Action dated Apr. 29, 2010, issued in corresponding European Patent Application No. 05253652.1.
European Search Report dated May 28, 2009, issued in corresponding European Patent Application No. 05253652.1.

* cited by examiner

*Primary Examiner* — David Dunn
*Assistant Examiner* — Philip Gabler
(74) *Attorney, Agent, or Firm* — Westerman, Hattori, Daniels & Adrian, LLP

(57) ABSTRACT

The active headrest of the invention includes individual parts provided in a seat back. The individual parts include a lower unit which operates by an impact given to a frame, a wire which elevates/lowers inside the seat back linked to the lower unit, a solenoid to which the wire is locked and/or an upper unit having the solenoid, and a headrest device linked to a lifter or a connecting portion of the upper unit. At the time of collision, the wire is tensioned downward, the lifter or connecting portion of the upper unit ascends or tilt forward, and the ascent and forward tilting of the headrest are performed instantaneously. As a result, this headrest can secure the ascent stroke and forward tilting which can follow the movement of a head, etc. at the time of collision, and can protect a head, etc.

11 Claims, 28 Drawing Sheets

(FIRST EXAMPLE)

| embodiment | solenoid | | second wire | | sensor for upper unit | | third spring | | shape of lifter guide | | V-shaped slit in lifter regulating lever | |
|---|---|---|---|---|---|---|---|---|---|---|---|---|
| | with | without | with | without | with | without | with | without | flat | tapered | with | without |
| FIRST EXAMPLE | ○ | | | ○ | ○ | | ○ | | ○ | ○ | | ○ |
| SECOND EXAMPLE | ○ | | | ○ | ○ | | ○ | | ○ | ○ | | ○ |
| THIRD EXAMPLE | ○ | | ○ | | ○ | | ○ | | ○ | ○ | | ○ |
| FOURTH EXAMPLE | ○ | | ○ | | ○ | | ○ | | ○ | ○ | ○ | |
| FIFTH EXAMPLE | ○ | | | ○ | ○ | | | ○ | ○ | ○ | | ○ |
| SIXTH EXAMPLE | | ○ | ○ | | | ○ | | ○ | ○ | ○ | | ○ |

HEADREST DEVICE FOR ACTIVE HEADREST

BACKGROUND OF THE INVENTION

1. Field of the Invention

The invention relates to a headrest device for an active headrest for protecting a person at the time of impact (at the time of collision), and particularly, relates to a headrest device for an active headrest, which is capable of achieving protection of a person's head and neck and upward movement (ascent) and forward tilting of the headrest at high speed (or instantaneously) before ascent of the head (extension of the neck) at the time of collision, thereby achieving avoidance of whiplash, avoidance of neck injury, and the like through the protection of the head and neck.

2. Description of the Related Art

As known in the art, quality required for an automobile (vehicle) has evolved to include emission, horse power, fuel efficiency, safety, silence and ride comfort to meet demands of various kinds of people, such as passengers. Among these qualities, with a need to improve headrest performance from the standpoint of safety, for example, an active headrest has been put in practical use and inventions to support such practical use have been made. The headrest has as its requirements quick ascent and forward tilting of the headrest, accurate movement of the headrest, suppression of rattling sounds, an ensured role of the headrest at an emergency from the standpoint of frequent occurrence of accidents and/or various collisions, and the like.

The headrest meets a passenger's needs by being typically installed about 30 mm to 50 mm away from the passenger's head, without contact with the passenger's head to alleviate the passenger's unpleasant feeling. However, in actuality, such a headrest may cause an unexpected trouble at an emergency such as an impact and/or collision. An example of such a trouble is given below, including the relationship between the headrest and a seat.

In the prior art, a seat protects a passenger's back against an impact since the passenger's back contacts a seat back for the purpose of safety and/or comfortable driving. However, the above-mentioned headrest device does not protect the passenger's head, which gets away from the headrest. This is because the passenger's head vectorially moves upward at the time of collision. Thus, as the passenger's neck is extended, the passenger may suffer injuries ranging from light injury such as whiplash to a severe situation such as neck injury and/or amputation.

Under such circumstances, various techniques have been proposed to avoid whiplash and/or neck injury (protect a neck and/or a head) caused at the time of collision. The following Patent Documents may be cited as examples of these techniques. However, it can not be said that headrest devices disclosed in these documents are necessarily sufficient as headrest devices for an active headrest to protect a neck by ascending by a certain distance and forwardly tilting instantaneously.

JP-A-2005-296266 discloses a seat structure for a vehicle. This invention provides a seat for a vehicle in which the seat includes extendible/contractable side frames provided in a seat frame, a solenoid including a forward tilting mechanism provided between the side frames, and a headrest stay which can be elevated/lowered with respect to a headrest support provided in the solenoid, wherein a headrest can be tilted forward by the forward tilting mechanism and can be raised by ascent of the headrest stay. This technique of JP-A-2005-296266 intends to protect a passenger's neck and/or head by moving the upper part of the body of the passenger backward and moving the passenger's neck and/or head upward during rear-end collision through the ascent and forward tilting of the headrest.

Further, JP-A-2001-163099 discloses a seat structure for a vehicle. This invention provides a seat structure for a vehicle in which a headrest holder supporting a headrest stay ascends and tilts forward via a guide means provided in a frame, the guide means can return to its initial position by a regulating spring, and forward tilting and ascent of the guide means are regulated by a passive means such as a textile belt disposed in a seat back. This technique of JP-A-2001-163099 also intends to protect a passenger's neck and/or head, like JP-A-2005-296266.

Further, JP-A-2000-219069 discloses a seat structure for a vehicle. This invention provides a seat for a vehicle, including an upper pipe provided in a seat back frame, a pipe frame which is attached to the upper pipe and in/from which a headrest stay spliced and fixed to the upper pipe can be inserted/detached, a headrest supporting frame for forwardly tilting the pipe frame, and a pressure receiving portion provided in a frame for forwardly tilting the headrest supporting frame and the headrest. Accordingly, the seat back is raised and tilted forward by moving the headrest supporting frame and the pipe frame by pressing of the pressure receiving portion. This technique of JP-A-2000-219069 intends to further move the headrest forward in response to the movement amount of the pressure receiving portion with the backward movement of the upper half of the body of a passenger at the time of collision and further intends to achieve this series of operations with a simpler construction.

Moreover, JP-A-2000-211410 discloses a seat structure for a vehicle. This invention provides a seat for a vehicle in which a headrest supporting frame is provided at an upper end of a lever link mechanism secured to a seat back frame. The lever link mechanism is constituted by a lever rocking vertically in interlocking with a pressure receiving portion which moves by receiving a load at the time of collision, a first link interposed between the lever and the headrest supporting frame, and a second link interposed between the first link and the seat back frame. This technique of JP-A-2000-211410 intends to move the headrest supporting frame and the headrest diagonally forward and upward by increasing the movement amount of the pressure receiving portion to prevent a passenger from being damaged due to ascent of the passenger's head (to protect the passenger's neck and/or head).

JP-A-2005-296266 intends to protect the passenger's neck and/or head at the time of collision by ascent and forward tilting of the headrest. However, the technique of this JP-A-2005-296266 employs only a solenoid in which a forward tilting mechanism is provided. Therefore, this technique has room for further improvement, since it may be complicated in its structure and may not correctly operate in an emergency at the time of collision. In addition, when a surface of the seat back is lifted up, there is a possibility of occurrence of resistance against the ascent and/or forward tilting of the active headrest. In particular, there is a possibility of occurrence of a problem when the surface of the seat back has low tenacity and/or flexibility, like leather for luxury cars, synthetic leather, etc.

JP-A-2001-163099 also intends to protect the passenger's neck and/or head at the time of collision by ascent and forward tilting of the headrest. However, the technique of this JP-A-2001-163099 employs a construction in which the headrest stay is raised by a passive means such as a textile belt or the like. Therefore, in this technique, the movement distance of the ascent of the headrest is considered to be insufficient. For example, this technique has no consideration for the ascent of the passenger's head and thus has room for improvement to protect the passenger's head fully at the time of collision. A problem of a surface of the headrest is about the same as in JP-A-2005-296266.

JP-A-2000-219069 and JP-A-2000-211410 intend to protect the passenger's head fully at the time of collision by ascent of the headrest to the front. However, the techniques of these documents have room for improvements in the ascent distance and ascent speed to protect the passenger's head fully at the time of collision, through active ascent and forward tilting of the headrest. Further, when it is considered that the movement of passenger's head at the time of collision, ascent and/or descent with good response, etc., are secured, the technique of the document is not necessarily satisfactory. A problem of a surface of the headrest is about the same as JP-A-2005-296266.

However, there exists no active headrest to protect a passenger's head fully at the time of collision irrespective of body type or seating postures of the passenger. In addition, it is difficult for various conventionally improved active headrests to secure safety and relief of a passenger, comfort of traveling and driving, etc.

SUMMARY OF THE INVENTION

In the light of the above circumstances, the invention provides a headrest device for active headrest which can exhibit the following characteristics [1] to [7].

[1] A headrest device for an active headrest, which has an active headrest structure which is buried in a seat back, is provided in a frame and/or an intermediate member of the seat back to perform ascent and forward tilting, is composed of a solenoid and/or a spring, and a plurality of wires, and moreover includes an upper unit, and a lower unit which can secure simple and positive movement. This headrest has a construction in which a headrest is in a predetermined raised state or forward tilting state before ascent of a head after collision, allowing a headrest protecting a head and/or neck to ascend or tilt forward at a high speed before the ascent of the head or the extension of the neck at the time of collision. This headrest can achieve avoidance of whiplash, avoidance of neck injury, and the like.

[2] A headrest device for an active headrest, which can protect the function of the headrest even if a vehicle is partially damaged, can allow the descent of the raised headrest, can achieve reuse of the headrest, can secure ascent/descent and forward tilting having good response, and can be provided for actual use.

[3] A headrest device for an active headrest, having a construction in which an upper unit and a lower unit are linked via a wire (one wire or preferably several wires), the upper unit is operated by the command of the lower unit, and the ascent and forward tilting is secured instantaneously (at high speed).

[4] A headrest device for an active headrest, having a construction in which a head or the like can be protected by exact measures irrespective of passenger's body type (high or low height, heavy or light weight, high or low degree of obesity, etc.), or seating postures (under all conditions), and which can secure safety, sense of security, comfort of traveling and driving, etc.

[5] A headrest device for an active headrest, having a construction in which the upper unit includes an upper unit body, a movable body, and a supporting arm for forward tilting of the headrest, a sheath pipe, a lifter, a lifter guide, a first wire, and a connecting portion are provided for the ascent of the headrest, where some of the elements are shared, and where the headrest device can execute the operation of the ascent and forward tilting accurately, instantaneously, and without erroneous operation.

[6] A headrest device for an active headrest, which can perform the ascent and/or forward tilting of the active headrest irrespective of the skin of a seat back (without pulling the skin), and can eliminate resistance resulting from lifting of the skin.

[7] A headrest device for an active headrest, having a construction in which the upper unit of the headrest includes a sheath pipe, a lifter, a lifter guide, a first wire, and a connecting portion, and which can be reliably operated by detection of a collision sensor set in a vehicle, and can execute the operation of the ascent and forward tilting of the headrest accurately, instantaneously, and without erroneous operation.

A first embodiment of the invention intends to achieve the objects described in the aforementioned [1] to [7].

The first embodiment is a headrest device for an active headrest comprising: an ascent/forward tilting mechanism which performs the upward movement (ascent) of the headrest and the tilting (forward tilting) of the headrest in an advance direction of a vehicle; and a headrest device which ascends and tilts forward by the ascent/forward tilting mechanism. The ascent/forward tilting mechanism includes an upper unit provided in the seat; a lifter further provided in the upper unit so as to be capable of elevating/lowering and forward tilting; a first wire having one end linked to the lifter; a lower unit linked to the other end of the first wire and provided in the seat; and a locking/unlocking device provided in the vehicle to unlock locking of the first wire. The headrest device includes a headrest bracket provided in the upper unit; a headrest support fitted into the headrest bracket; a headrest stay loosely fitted into the headrest support; and a headrest provided in this headrest stay. The upper unit includes a substantially rectangular upper unit body; a supporting arm supporting the headrest bracket pivotally mounted on the upper unit body; a sheath pipe provided at the center of the upper unit body; a lifter regulating lever elevating/lowering within the sheath; and a pulley provided in an upper portion of the upper unit body. The lifter includes a lifter guide provided so as to move into or out of the sheath pipe vertically provided in the lifter body; and a connecting portion locked to the headrest brackets vertically provided at both ends of the lifter body. The lower unit includes a lower unit movable body; a cam plate pivotally mounted on the lower unit; and an operating arm. The locking/unlocking device includes a collision sensor provided in the vehicle; and a solenoid or a fastening mechanism. The lifter is operated via the first wire to achieve the ascent and forward tilting of the headrest bracket and the headrest.

A second embodiment of the invention intends to provide a locking/unlocking device optimal for achieving the object of the first embodiment.

The second embodiment is the headrest device for an active headrest according to first embodiment, in which the locking/unlocking device includes a solenoid built into the sheath pipe of the upper unit to control the lifter guide, and a second spring fitted on the sheath pipe.

The third or fourth embodiments of the invention intend to provide a lifter guide, a sheath pipe, and a linking structure, which are optimal for achieving the object of the first embodiment.

The third embodiment is the headrest device for an active headrest according to the first embodiment, in which a linking structure between the sheath pipe and the lifter guide includes a solenoid movably provided in the sheath pipe and having the first wire locked thereto, a second spring provided between the sheath pipe and the lifter guide, an eaves portion provided in the upper portion of the lifter guide in which the second spring is retained, and a cut groove provided in the sheath pipe into which this lifter guide is inserted.

The fourth embodiment is the headrest device for an active headrest according to the first embodiment, in which a linking structure between the sheath pipe and the lifter guide includes a solenoid movably provided in the sheath pipe and having a second wire obtained by extending the first wire locked thereto, a second spring provided between the sheath pipe and the lifter guide, an eaves portion provided in the upper portion of the lifter guide in which the second spring is retained, and a cut groove provided in the sheath pipe into which this lifter guide is inserted.

A fifth embodiment of the invention intends to provide the lifter and a headrest bracket structure provided in the connecting portion of the lifter, which are optimal for achieving the object of the first embodiment.

The fifth embodiment is the headrest device for an active headrest according to the first embodiment, in which the lifter, in which the structure of the headrest bracket provided in the connecting portion of the lifter includes one or more long holes formed at a lower end of the headrest bracket, and one or more claw pieces are formed on the connecting portion on the outer face thereof, the headrest bracket is fitted into the connecting portion, and the claw piece is fitted into and locked to the long hole.

A sixth embodiment of the invention intends to accommodate the solenoid or a guiding solenoid in the sheath pipe and provide the structure of the guiding solenoid, which are optimal for achieving the object of the first embodiment.

The sixth embodiment is the headrest device for an active headrest according to the first embodiment, in which the solenoid or a guiding solenoid is accommodated in the sheath pipe, and the guiding solenoid is adapted to return to its initial position through tension operation of the first wire.

A seventh embodiment of the invention intends to provide the structure of a lifter regulating lever optimal for achieving the object of the first embodiment.

The seventh embodiment is the headrest device for active headrest according to the first embodiment, in which the lifter regulating lever has an annular insert body at a lower end locking portion, and the annular insert body includes an annular receiving body provided at an upper end locking portion of the lifter guide.

An eighth embodiment of the invention intends to provide the structure of the lifter guide for achieving the object of the first embodiment.

The eighth embodiment is the headrest device for an active headrest according to the first embodiment, in which the lifter guide is located outside the second spring and the sheath pipe, and the lifter guide is adapted to move along the outside of the second spring.

A ninth embodiment of the invention intends to provide the structure of the lifter guide for achieving the object of the first embodiment.

The ninth embodiment is the headrest device for active headrest according to the first embodiment, in which the lower unit includes a lower unit movable body pivotally mounted on a lower unit body, a cam plate provided in the lower unit movable body, an operating arm rocked by the cam plate, a supporting ring locked to a fourth spring provided in a sheet and provided in the lower unit body, and a winding body in which the first wire capable of being adjusted and rotated via a pivot is locked to the operating arm.

A tenth embodiment of the invention intends to provide the length-adjusting structure of the first wire optimal for achieving the object of the first embodiment.

The tenth embodiment is the headrest device for active headrest according to the first embodiment, in which the length adjustment of the first wire is performed by the lower unit.

An eleventh embodiment of the invention intends to provide the structure of the upper unit optimal for achieving the object of the first embodiment.

The eleventh embodiment is the headrest device for active headrest according to the first embodiment, in which the upper unit is adapted to operate via the collision sensor provided in the vehicle.

The first embodiment is an headrest device for active headrest including an ascent/forward tilting mechanism which performs upward movement (ascent) of the headrest and the tilting (forward tilting) of the headrest in an advance direction of a vehicle, a headrest device which ascends and tilts forward by the ascent/forward tilting mechanism, upper and lower units which move the ascent/forward tilting mechanism, a lifter and a locking/unlocking device which regulates a wire which links the upper and lower units, and leaves the ascent, forward tilting, and the headrest at rest, the lifter being operated via the wire to achieve the ascent and forward tilting of the headrest bracket and the headrest.

Accordingly, the following features are provided.

[1] An active headrest structure which is buried in a seat back, is provided in a frame and/or an intermediate member of the seat back to perform ascent and forward tilting, is composed of a solenoid and/or a spring, and a plurality of wires, and moreover includes an upper unit, and a lower unit which can secure simple and positive movement. A construction in which a headrest is in a predetermined raised state or forward tilting state before ascent of a head after collision, thus allowing a headrest protecting a head and/or neck to ascend or tilt at a high speed forward before the ascent of the head or the extension of the neck at the time of collision, is provided, and avoidance of whiplash, avoidance of neck injury, and the like can be achieved.

[2] The function of the headrest can be protected even if a vehicle is partially damaged, the descent of the raised headrest can be allowed, reuse of the headrest can be achieved, ascent/descent and forward tilting having good response can be secured, and the headrest device can be provided for actual use.

[3] An upper unit and a lower unit are linked via a wire (one wire or preferably several wires), the upper unit is operated by the command of the lower unit, and the ascent and forward tilting is secured instantaneously (at high speed).

[4] A construction in which a head or the like can be protected by exact measures irrespective of passenger's body type (high or low height, heavy or light weight, high or low degree of obesity, etc.), or seating postures (under all conditions), is provided, and safety, sense of security, comfort of traveling and driving, etc. can be secured.

[5] A construction in which the upper unit includes an upper unit body, a movable body, and a supporting arm for forward tilting of the headrest, a sheath pipe, a lifter, a lifter guide, a first wire, and a connecting portion are provided for the ascent of the headrest, and some of the elements are shared is provided, and the operation of the ascent and forward tilting can be executed accurately, instantaneously, and without erroneous operation.

[6] The ascent and/or forward tilting of the active headrest can be performed irrespective of the skin of a seat back (without pulling the skin), and resistance resulting from lifting of the skin can be eliminated.

[7] A construction in which the upper unit of the headrest includes a sheath pipe, a lifter, a lifter guide, a first wire, and a connecting portion is provided, and the headrest device can be reliably operated by detection of a collision sensor set in a vehicle, and can operate the operation of the ascent and forward tilting of the headrest accurately, instantaneously, and without erroneous operation.

The second embodiment has a feature capable of providing a locking/unlocking device for the headrest device for active headrest, which optimal for achieving the object of the first embodiment.

The third or fourth embodiments have a feature capable of providing a lifter guide, a sheath pipe, and a linking structure, which are optimal for achieving the object of the first embodiment.

The fifth embodiment has a feature capable of providing the lifter and a headrest bracket structure provided in the connecting portion of the lifter, which are optimal for achieving the object of the first embodiment.

The sixth embodiment has a feature capable of accommodating the solenoid or a guiding solenoid in the sheath pipe and providing the structure of the guiding solenoid, which are optimal for achieving the object of the first embodiment.

The seventh embodiment has a feature capable of providing the structure of a lifter regulating lever optimal for achieving the object of the first embodiment.

The eighth embodiment has a feature capable of providing the structure of a lifter guide optimal for achieving the object of the first embodiment.

The ninth embodiment has a feature capable of providing the structure of a lifter guide optimal for achieving the object of the first embodiment.

The tenth embodiment has a feature capable of providing the length-adjusting structure of the first wire optimal for achieving the object of the first embodiment.

The eleventh embodiment has a feature capable of providing the structure of the upper unit optimal for achieving the object of the first embodiment.

BRIEF DESCRIPTION OF THE DRAWINGS

FIG. 1-2 is an entire reduced perspective view showing an example of a vehicle seat and a seat back.

FIG. 1-3 is a schematic side view conceptually showing the relationship between the seat back and an active headrest at a normal time (before collision).

FIG. 1-4 is a schematic side view conceptually showing the relationship between a seat back and an active headrest at the time of collision.

FIG. 2-1-1 is an entire front view showing the relationship between an upper unit of the active headrest and a headrest device at a normal time in a first example.

FIG. 2-1-2 is an enlarged front view showing the relationship between a lower end locking portion of a solenoid and an upper end locking portion of a lifter guide in the first example.

FIG. 2-1-3 is an enlarged front view for explaining an eaves portion of the upper end locking portion of the lifter guide in the first example.

FIG. 2-1-4 is an enlarged front view for explaining the relationship (inclined contact) between the lower end locking portion of the solenoid and the upper end locking portion of the lifter guide in the first example.

FIG. 2-1-5 is an enlarged front view for explaining the relationship (vertical contact) between the lower end locking portion of the solenoid and the upper end locking portion of the lifter guide in the first example.

FIG. 2-2 is an entire front view showing the relationship between an upper unit of an active headrest and a headrest device at a normal time in another first example.

FIG. 3-1-1 is an entire front view showing the relationship between an upper unit of an active headrest and a headrest device at a normal time in the second example.

FIG. 3-1-2 is an enlarged front view for explaining the relationship (inclined contact) between the lower end locking portion of the solenoid and the upper end locking portion of the lifter guide in the second example.

FIG. 3-1-3 is an entire front view showing a state before operation of a sheath pipe and the lifter guide in the second example.

FIG. 3-1-4 is an entire front view showing a state during operation of the sheath pipe and the lifter guide in the second example.

FIG. 3-1-5 is an entire front view showing a state after operation of the sheath pipe and the lifter guide in the second example.

FIG. 4-1-1 is an entire front view showing the relationship between an upper unit of the active headrest and a headrest device at a normal time in a third example.

FIG. 4-1-2 is an enlarged front view for explaining the relationship (vertical contact) between the lower end locking portion of the solenoid and the upper end locking portion of the lifter guide in the third example.

FIG. 5-1-1 is an entire front view showing the relationship between an upper unit of the active headrest and a headrest device at a normal time in a fourth example.

FIG. 5-1-2 is an enlarged front view for explaining the relationship (vertical contact) between the lower end locking portion of the solenoid and the upper end locking portion of the lifter guide in the fourth example.

FIG. 6-1 is a front view of a lower unit.

FIG. 6-2 is a plan view of the lower unit.

FIG. 7-1 is a side view showing the relationship between an upper unit and a lifter.

FIG. 8-1 is an entire front view showing the relationship between the upper unit of an active headrest and the headrest device at a normal time in the fifth example.

FIG. 8-2 is an entire front view showing the relationship between the upper unit of the active headrest and the headrest device during ascent in the fifth example.

FIG. 9-1 is an entire front view showing the relationship between the upper unit of an active headrest and the headrest device at a normal time in the sixth example.

FIG. 9-2 is an entire front view showing the relationship between the upper unit of the active headrest and the headrest device during ascent in the sixth example.

FIG. 11-1 is a side view showing an appendix scheme of a headrest bracket and a headrest support and the relationship between the upper unit and the lifter.

FIG. 11-2 is an enlarged side view of chief parts in FIG. 11-1.

FIG. 11-3 is an enlarged front view showing the appendix scheme of the headrest bracket and the headrest support and the headrest bracket.

DETAILED DESCRIPTION OF THE INVENTION

Embodiments of the invention will be described with reference to respective divided chief parts. The basic construction common to respective embodiments will be described.

The invention is an active head rest B mounted on a seat back A1 constituting a seat A of a vehicle. The active head rest B includes as its chief constituent elements a metallic frame 1 buried in the seat back A1, a lower unit C provided at a lower end of the frame 1, a first wire D linked to the lower unit C and provided from a lower portion of the frame 1 (seat back A1) toward an upper portion thereof, an upper unit E linked to the first wire D and provided in the upper portion of the frame 1, a collision sensor G provided if necessary, and a headrest device H provided in the frame 1 and including a headrest H1 capable of ascent and forward tilting by the operation of the upper unit E and the first wire D with respect to pulley 64. In addition, the collision sensor G is provided in a proper place of a vehicle.

Figure 1:
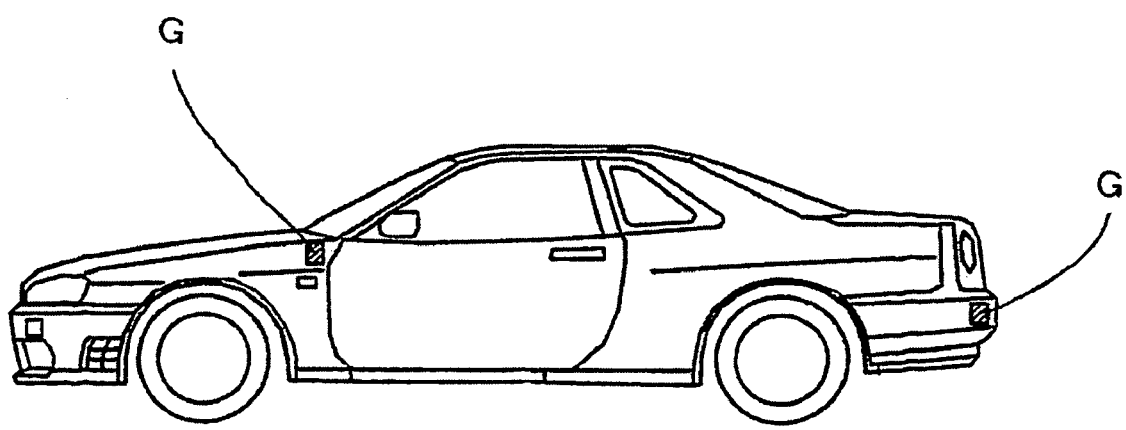
FIG. 1-1 is a reduced side view showing the relationship between a vehicle (automobile) and a collision sensor.
Figures 1, 2:
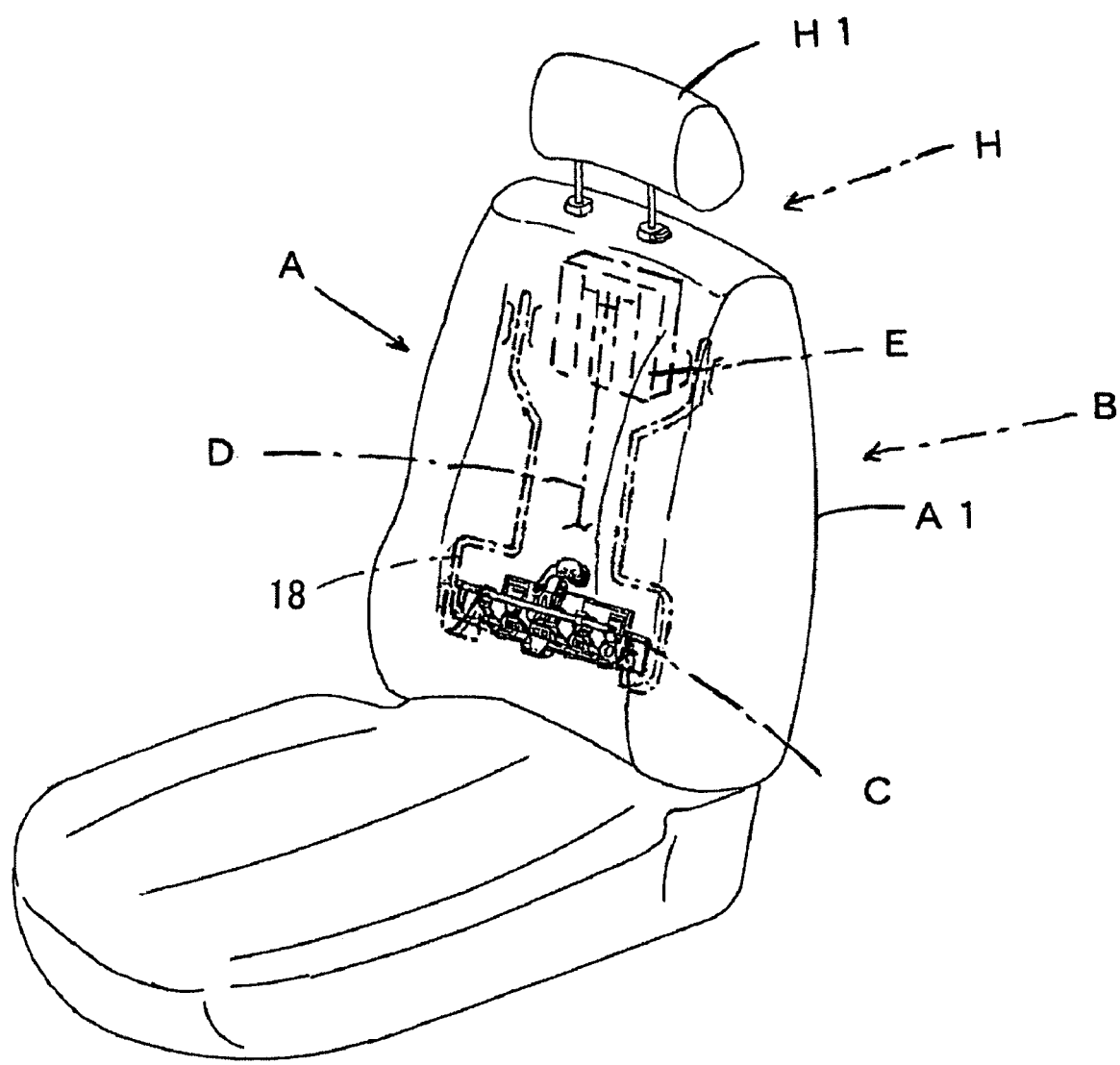
Figures 1, 2, 3:
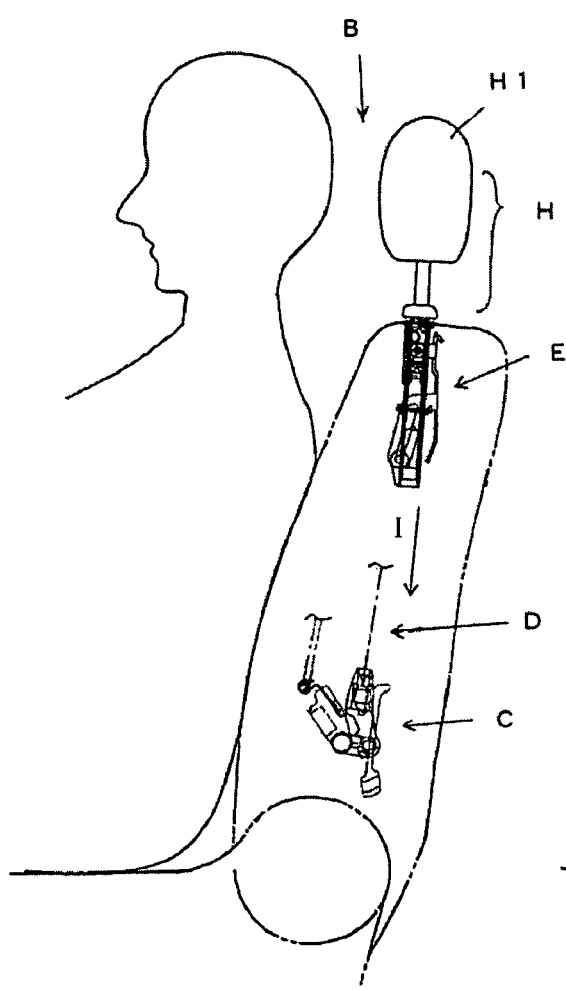
Figures 1, 2, 3, 4:
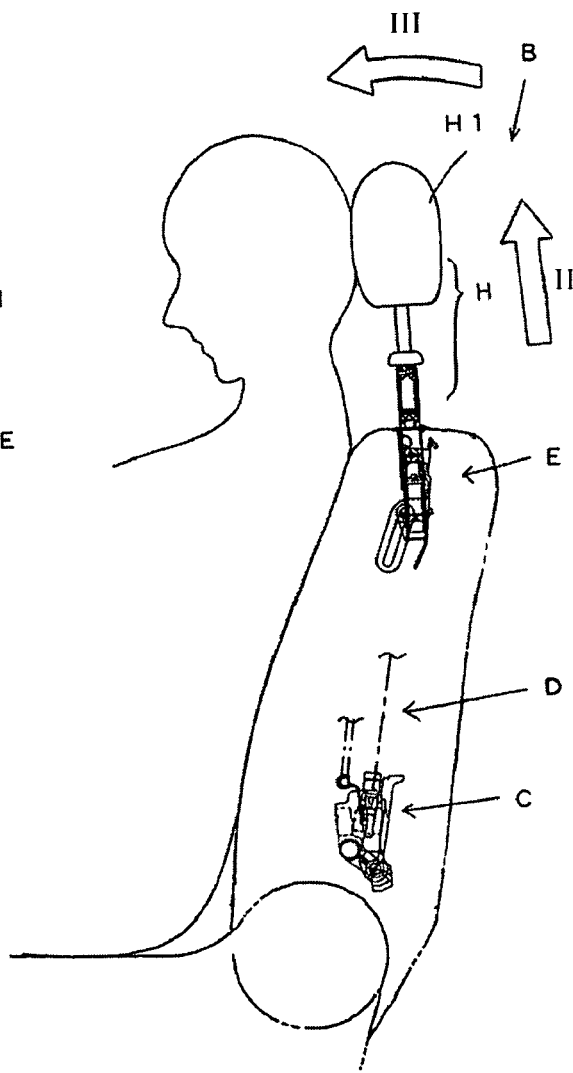
Figures 1, 2:
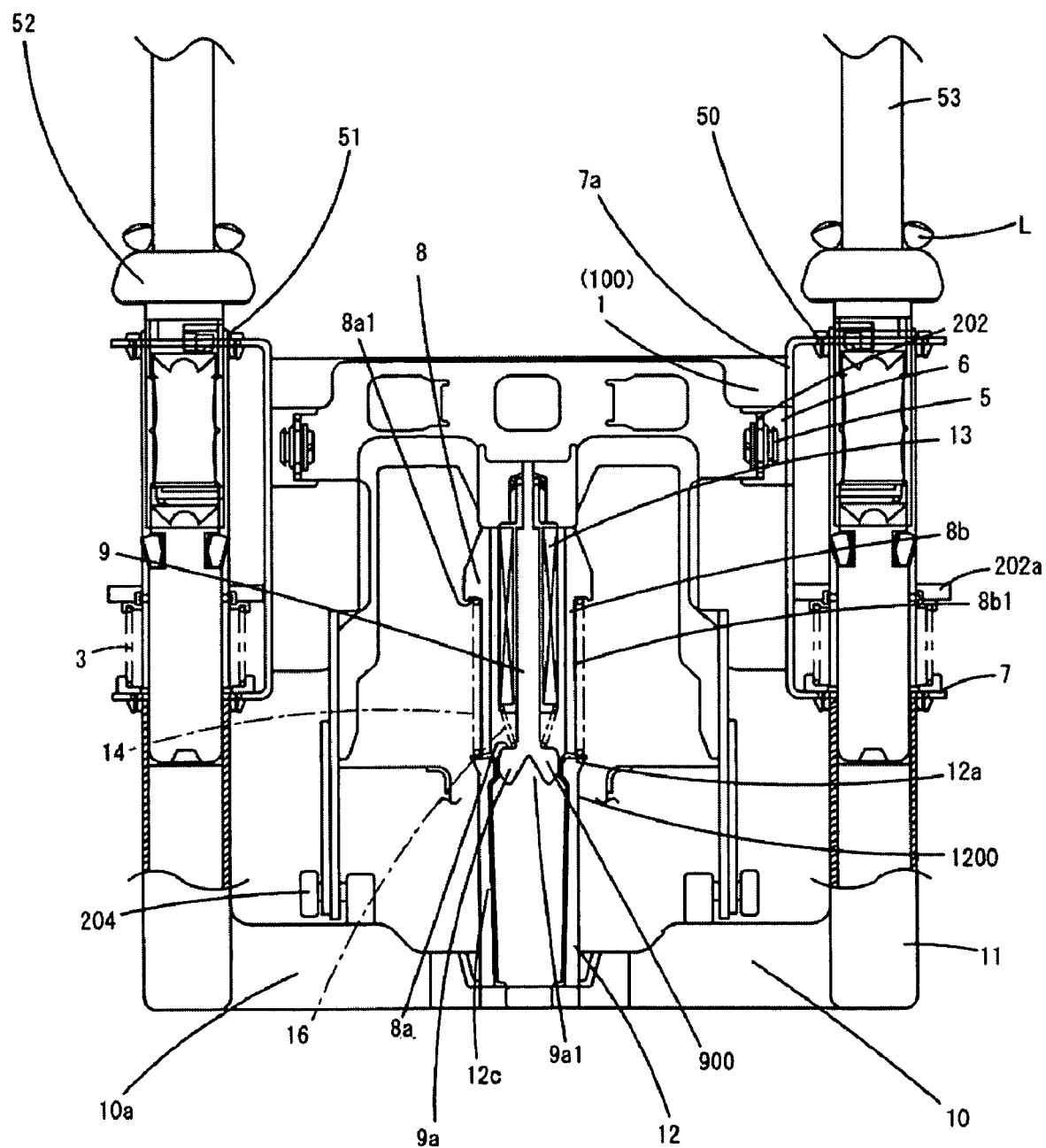
Figures 1, 2:
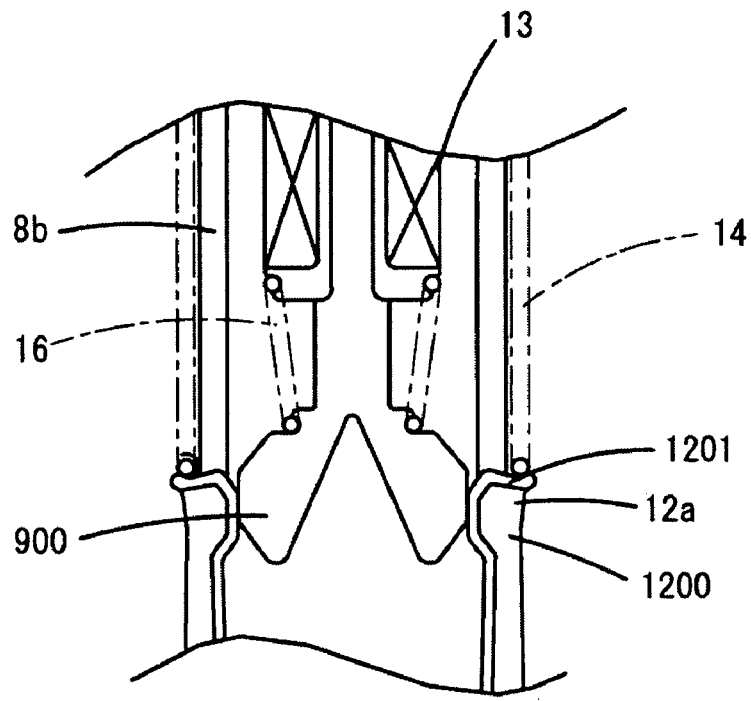
Figures 1, 2, 3:
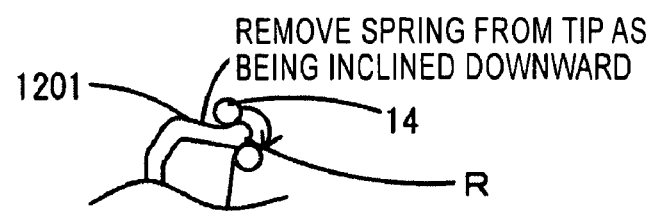
Figures 1, 2, 4:
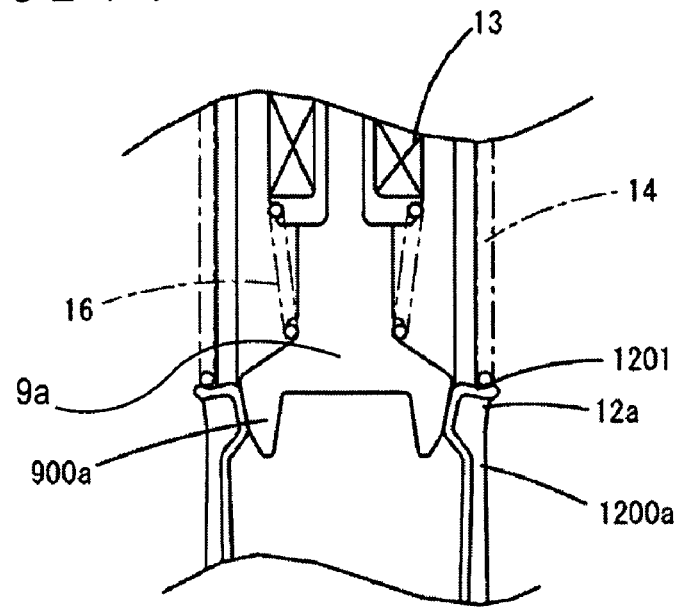
Figures 1, 2, 5:
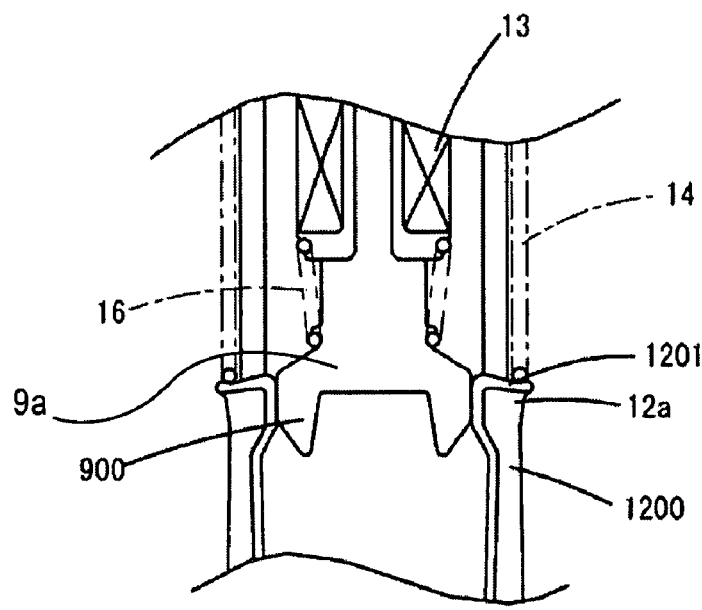
Figure 2:
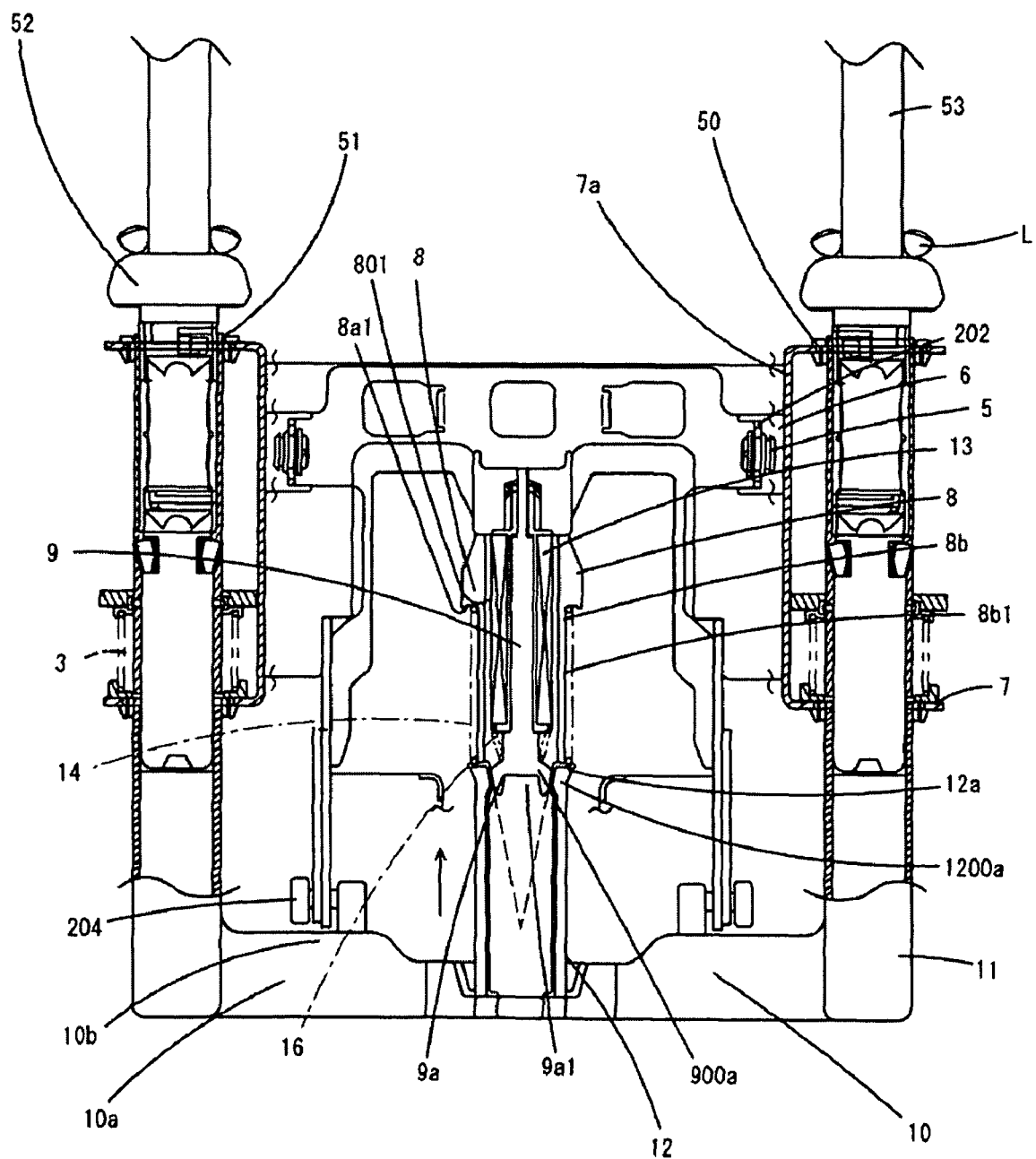
Figures 1, 3:
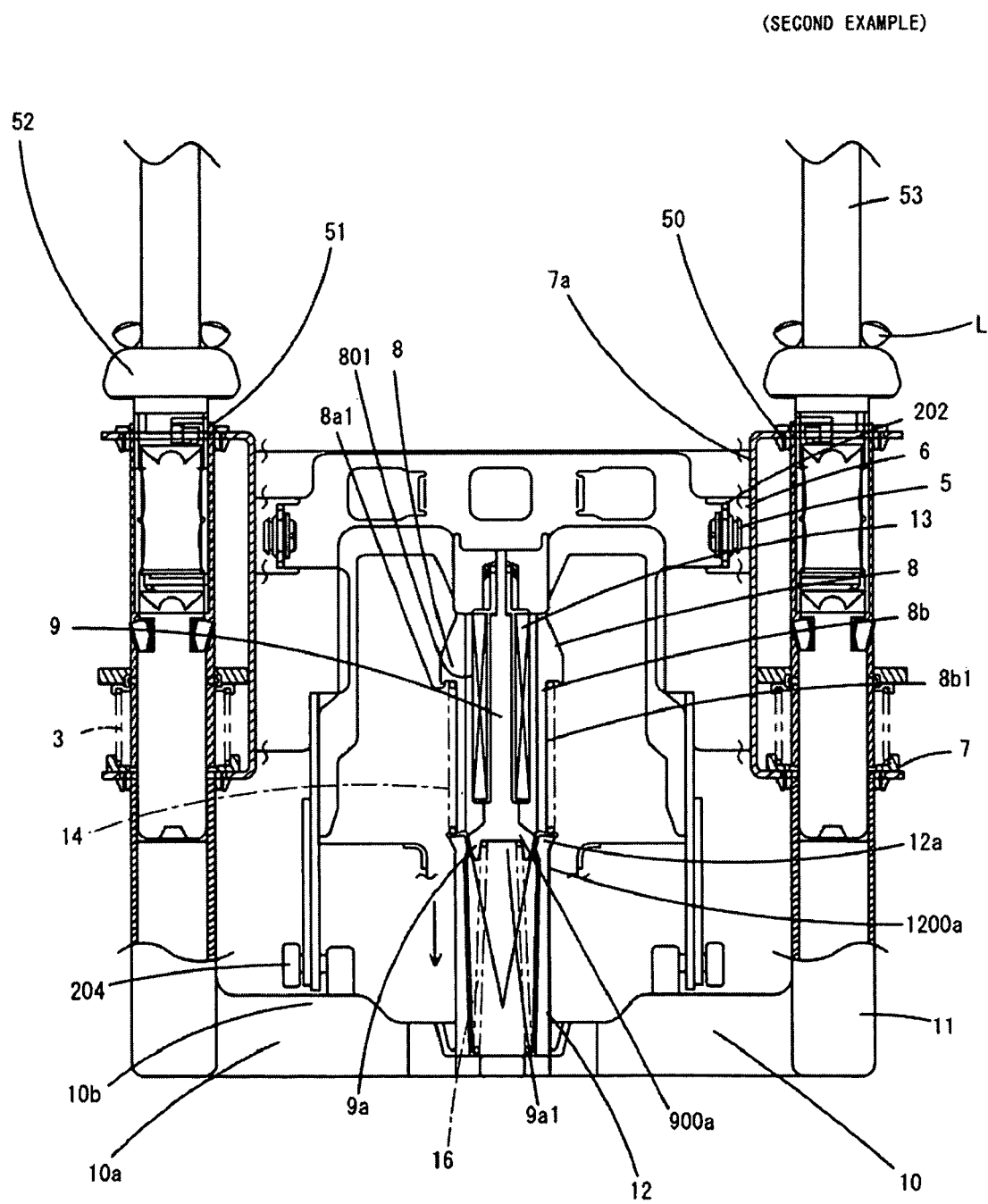
Figures 1, 2, 3:
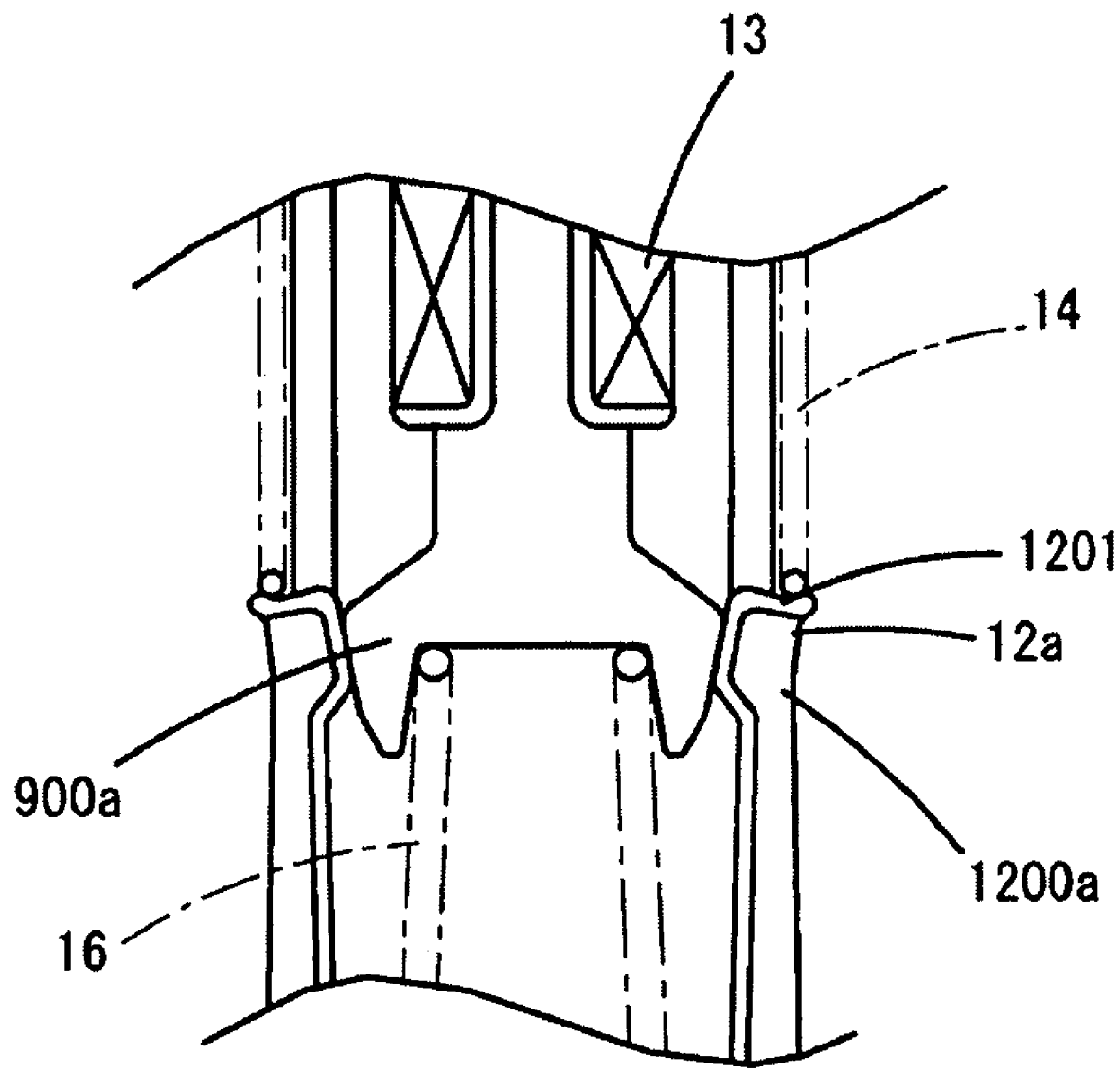
Figures 1, 3:
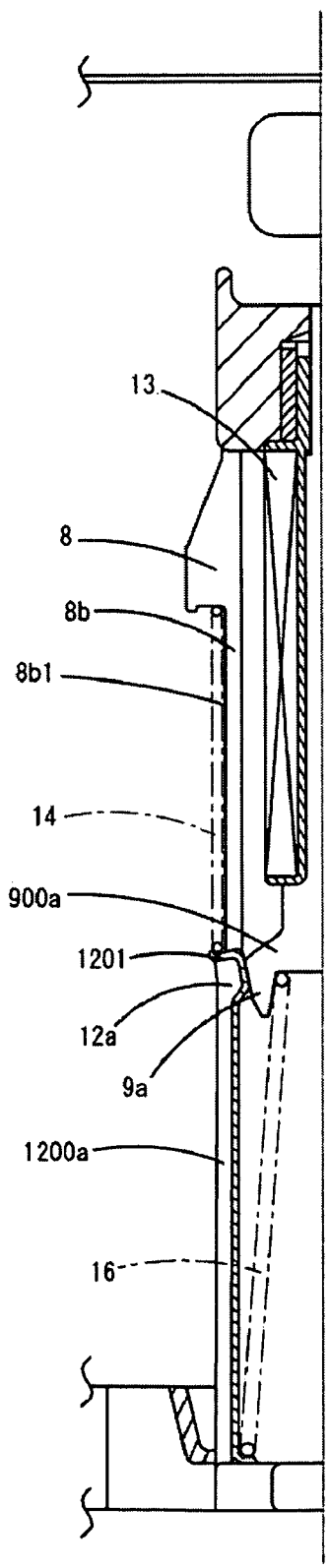
Figures 1, 3, 4:
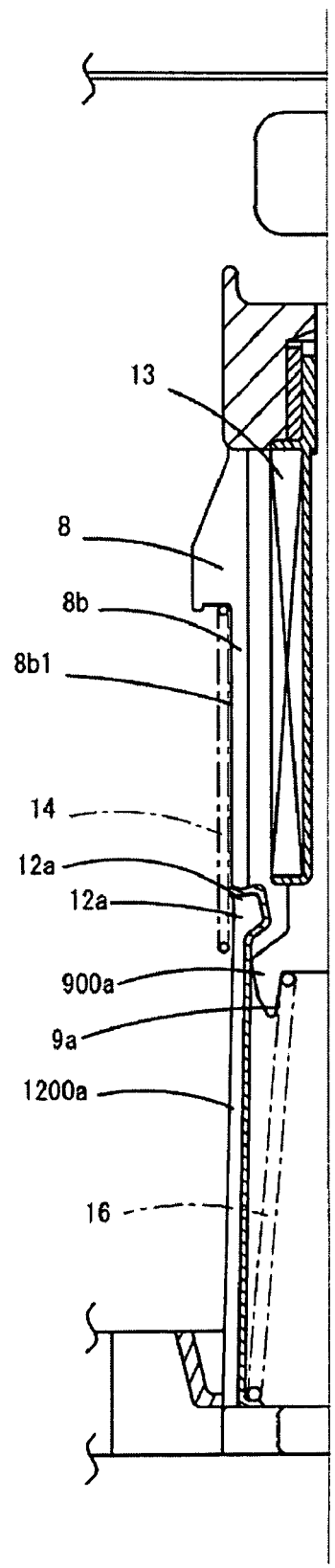
Figures 1, 3, 5:
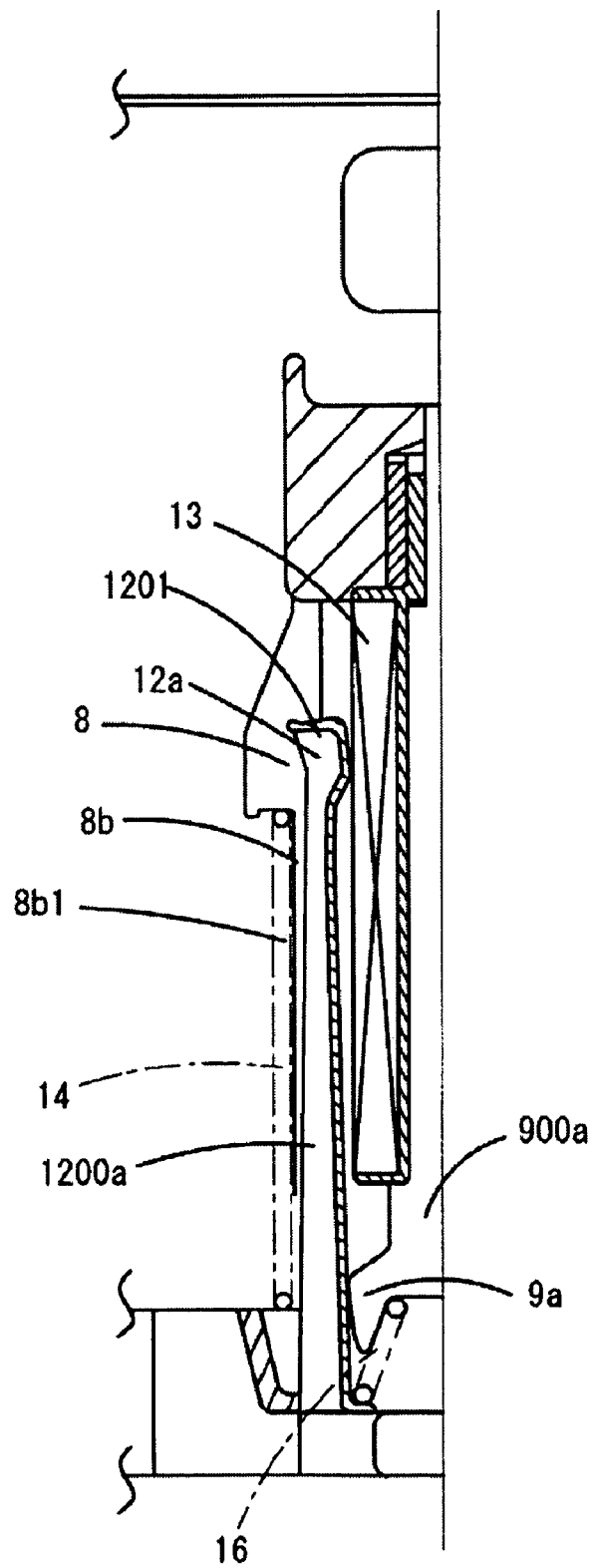
Figures 1, 4:
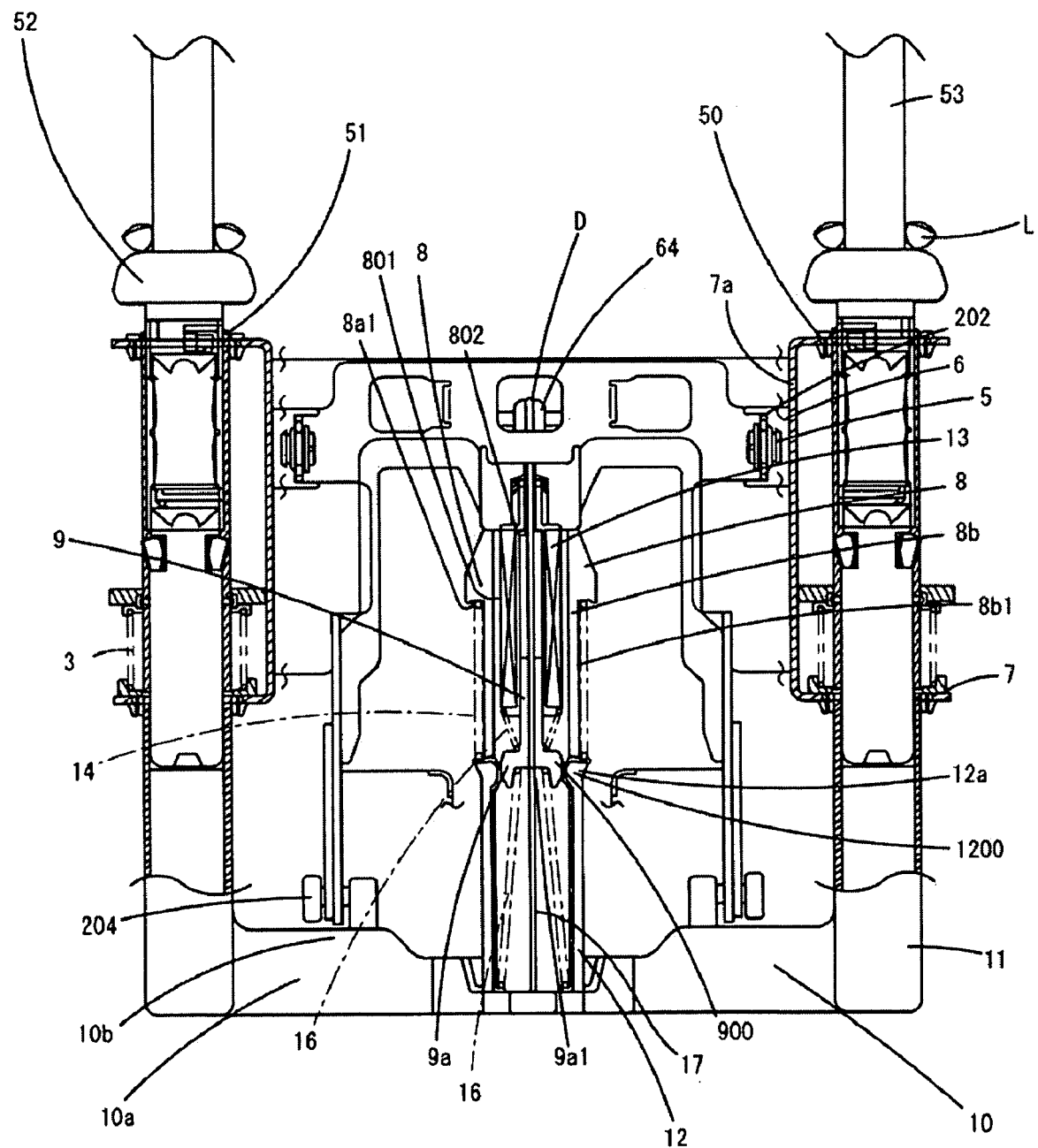
Figures 1, 2, 4:
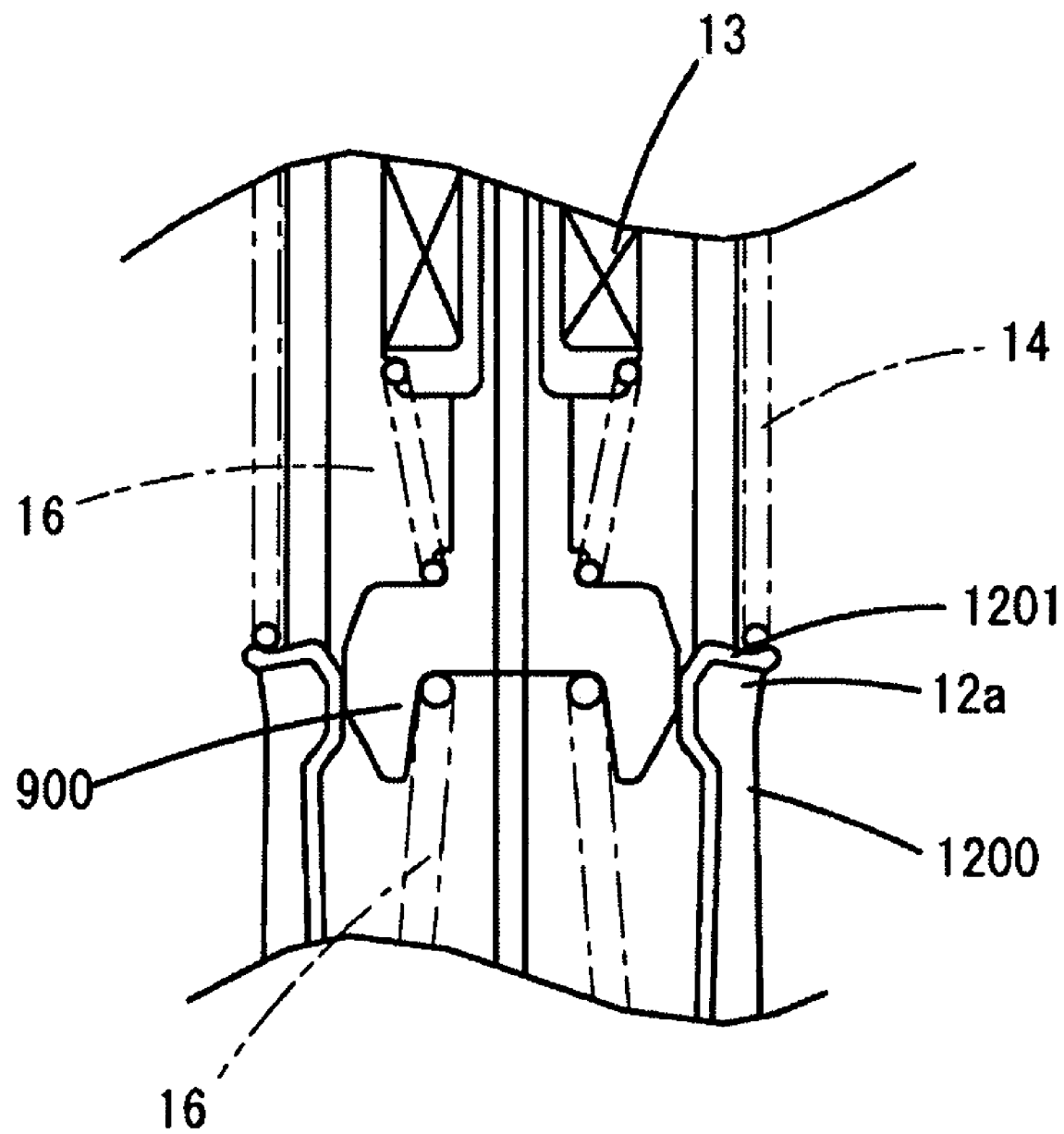
Figures 1, 5:
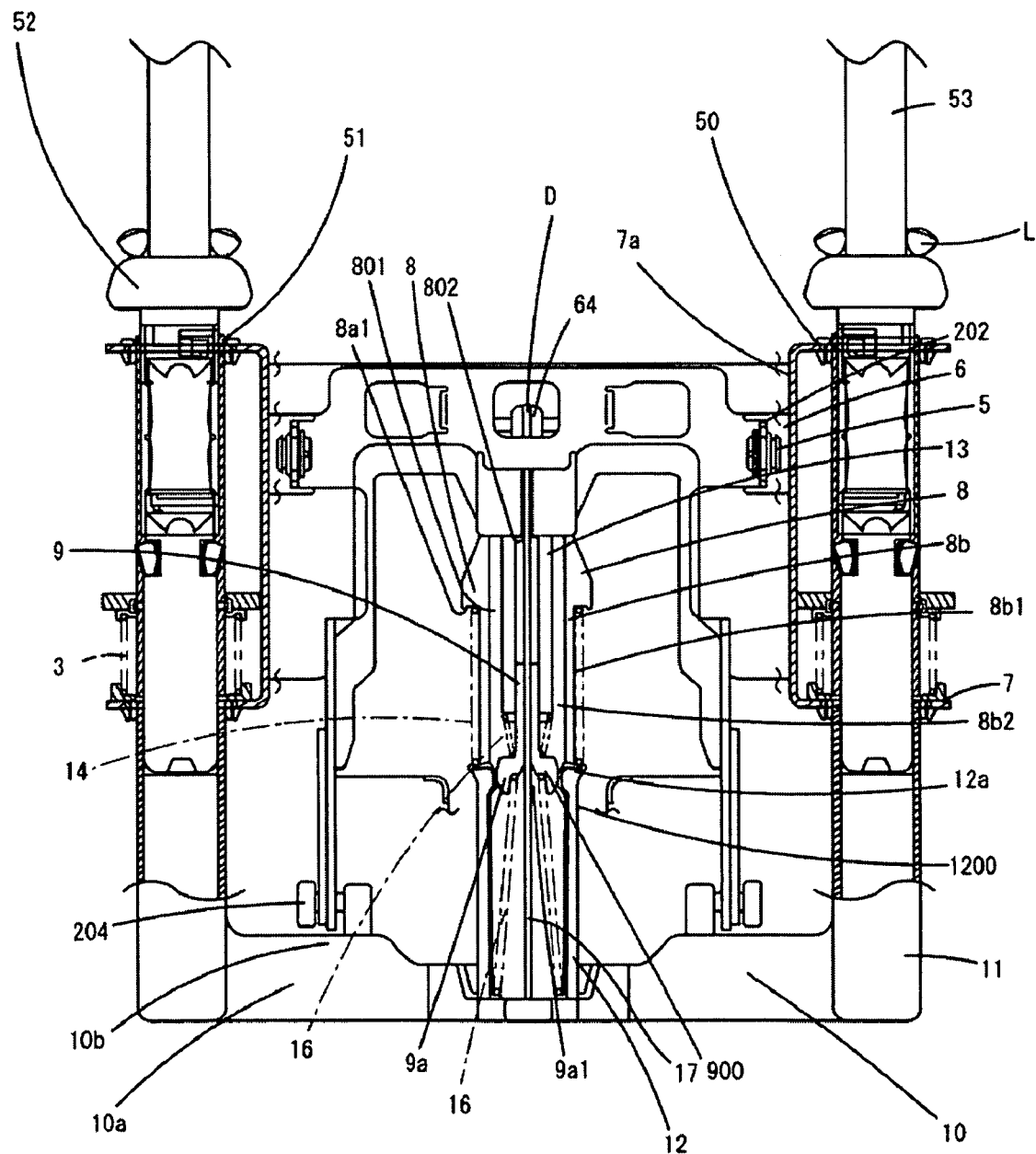
Figures 1, 2, 5:
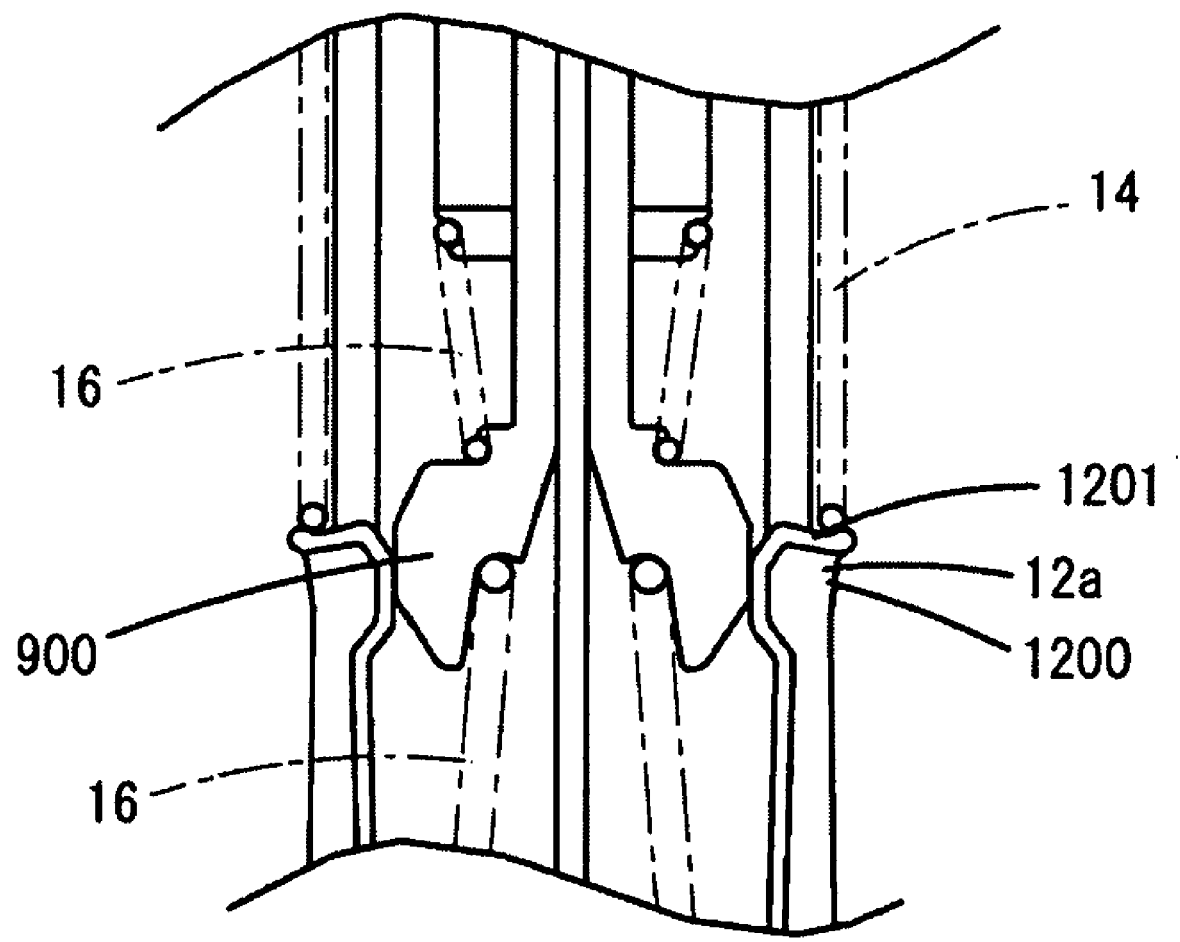
Figures 1, 8:
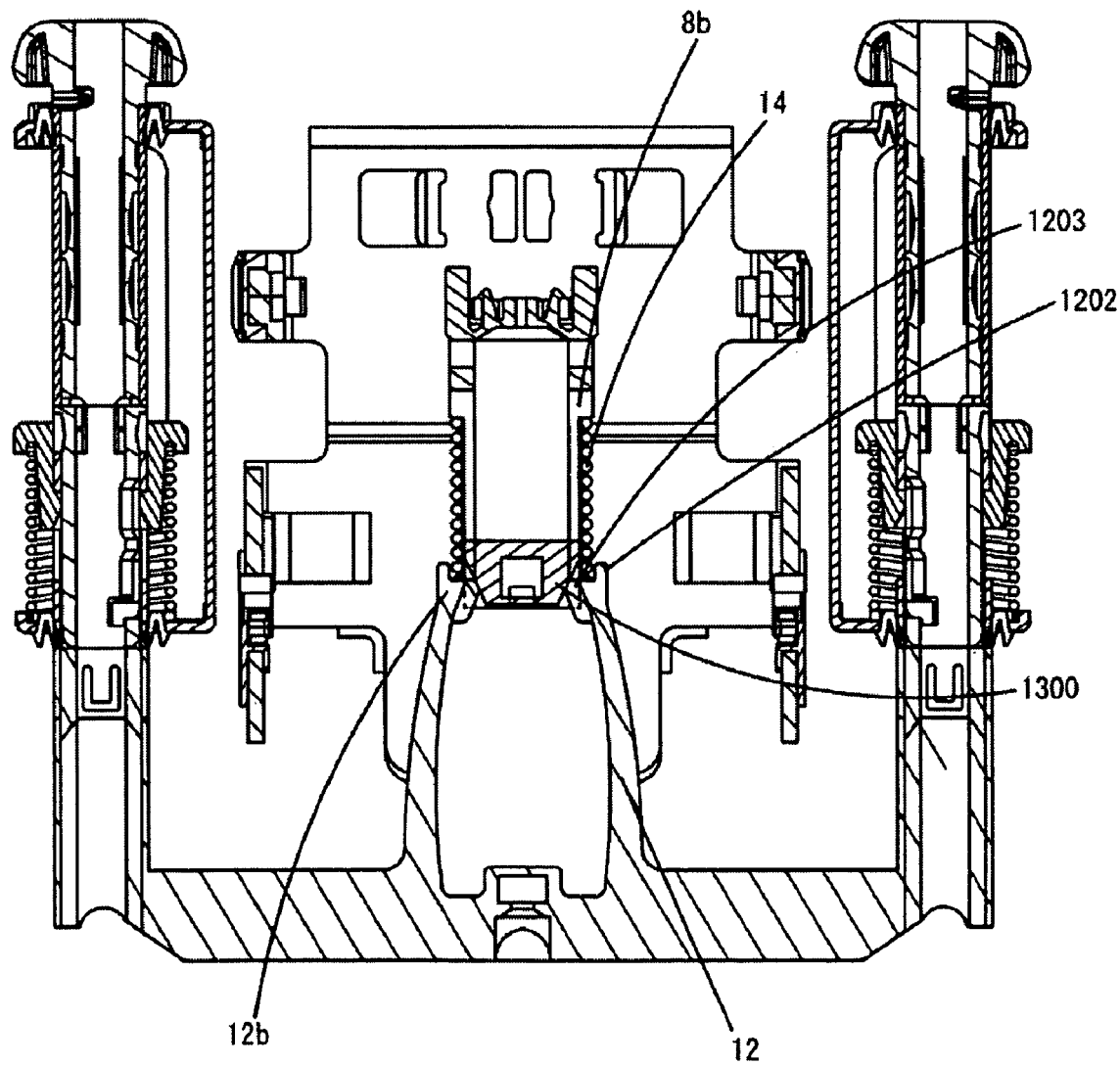
Figures 2, 8:
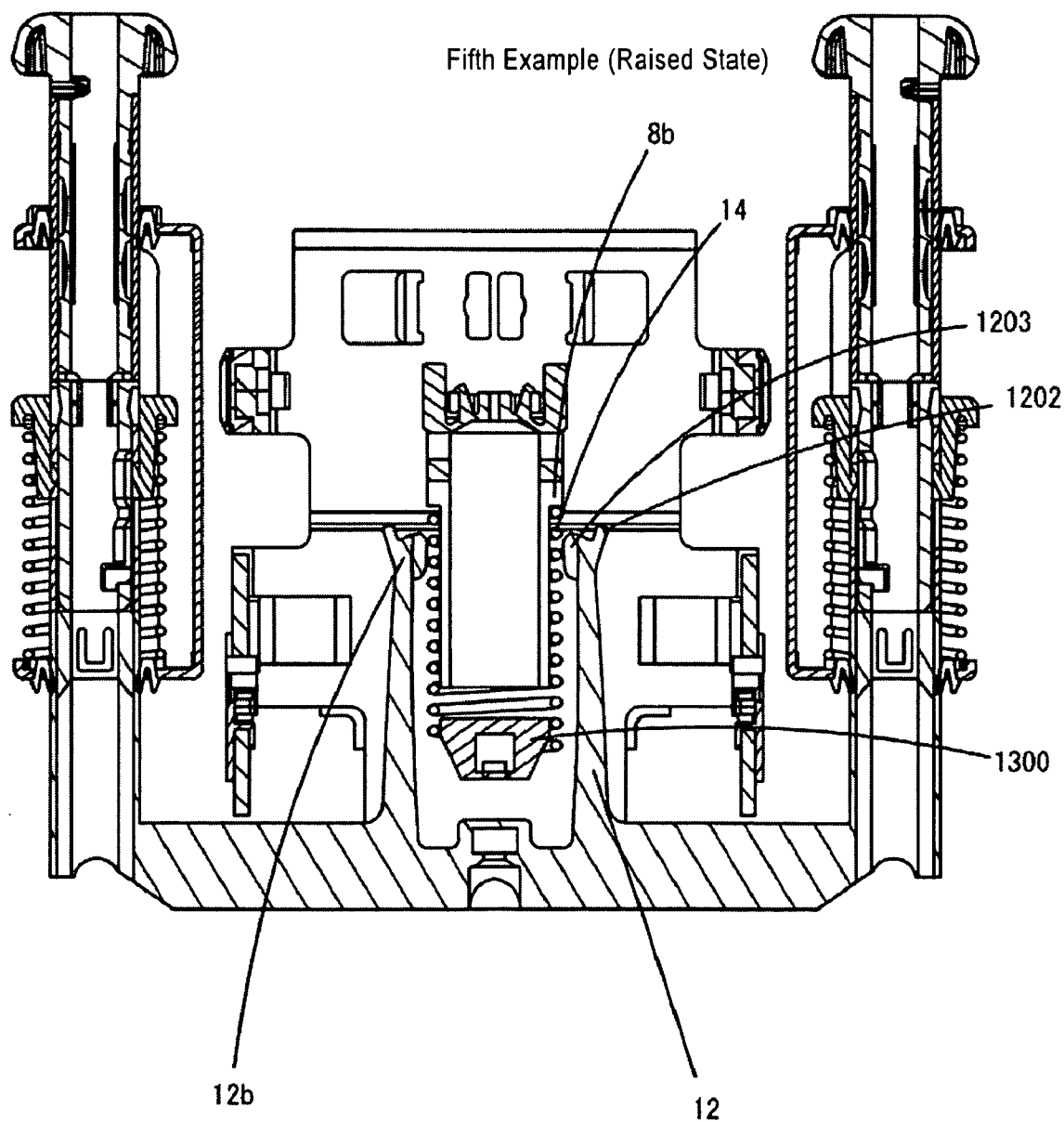
Figures 1, 9:
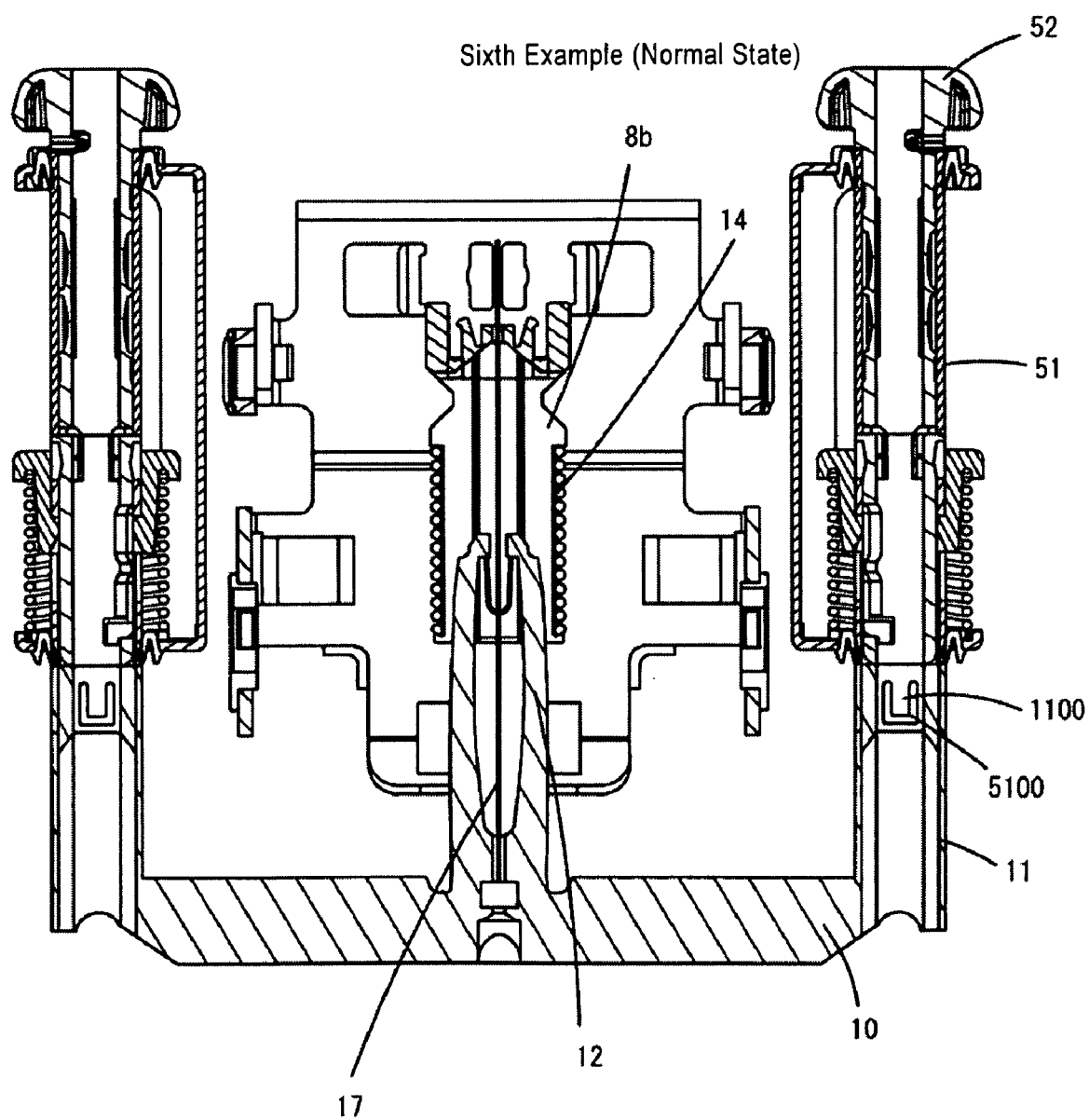
Figures 2, 9:
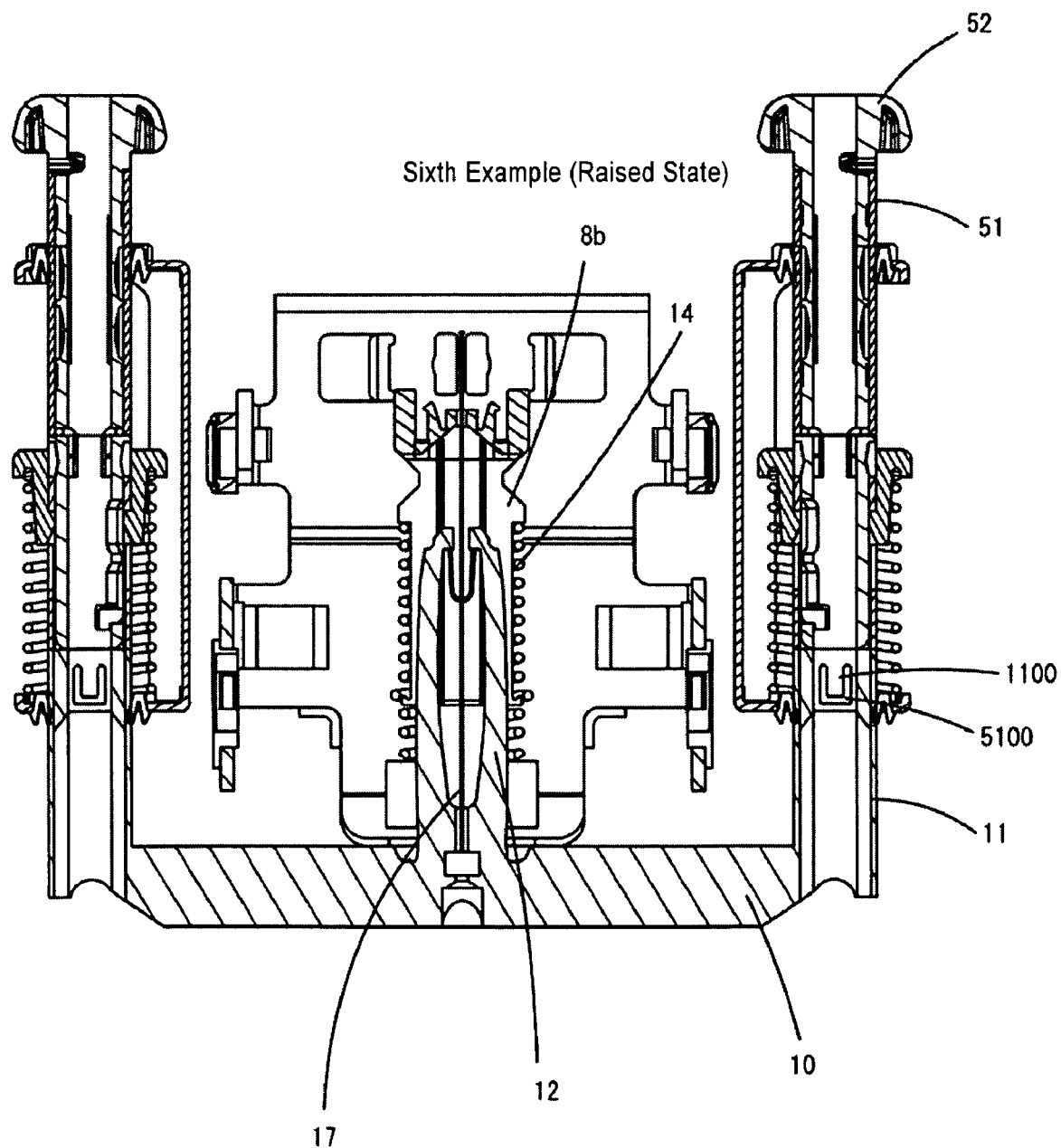
Figure 10:
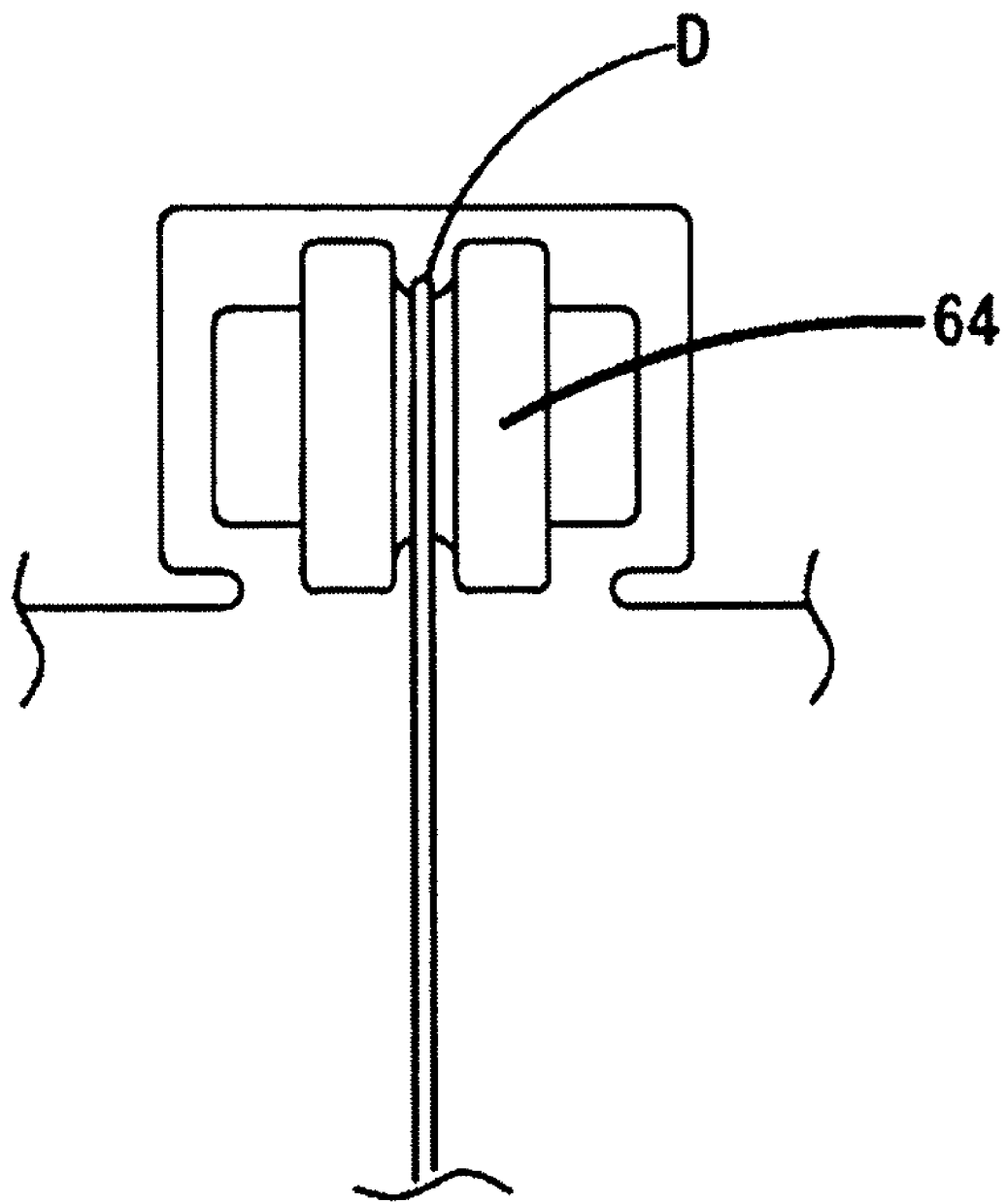
FIG. 10 is an enlarged front view showing the relationship between a pulley and a first wire.
Figures 1, 11:
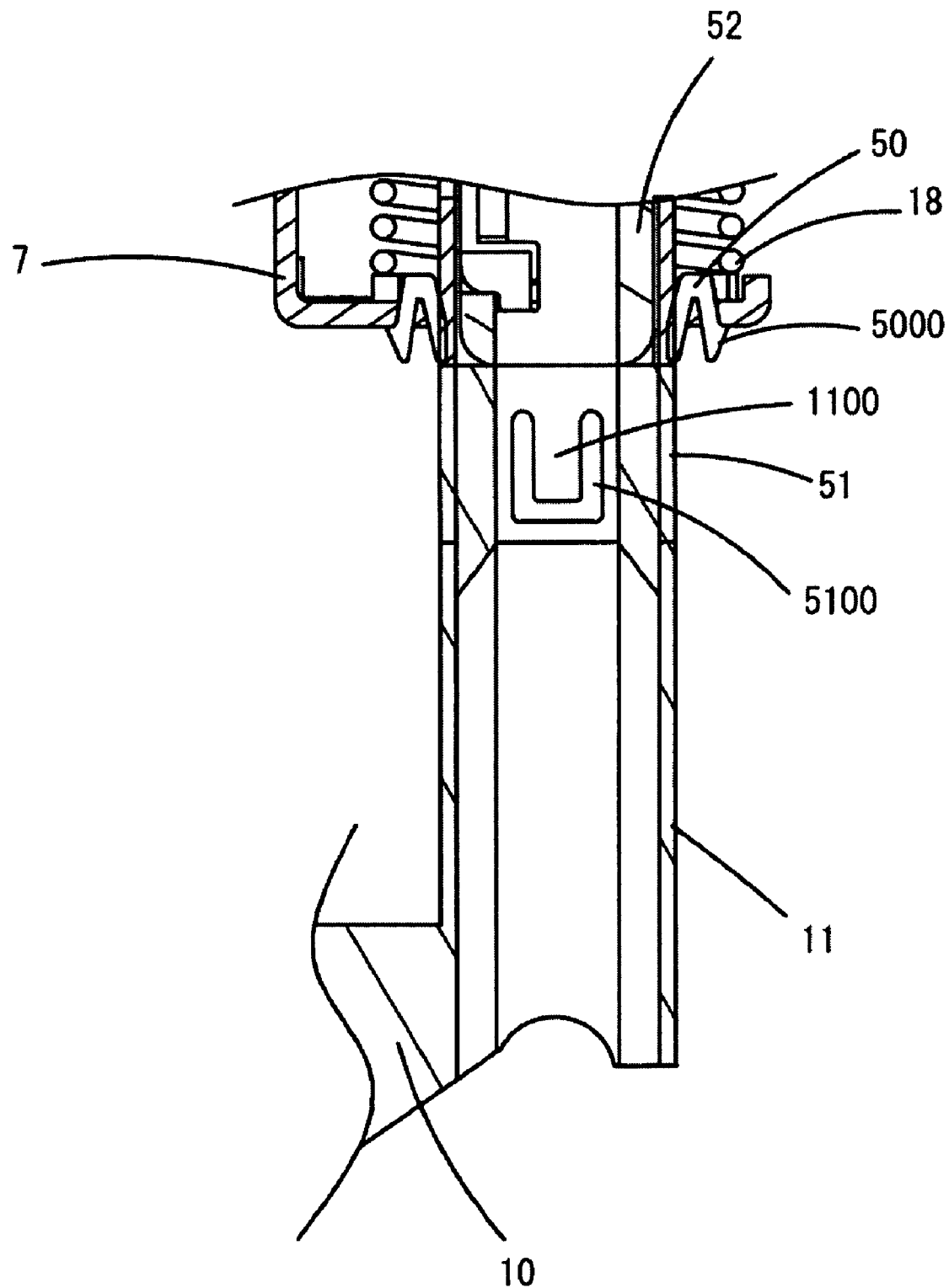
Figures 2, 11:
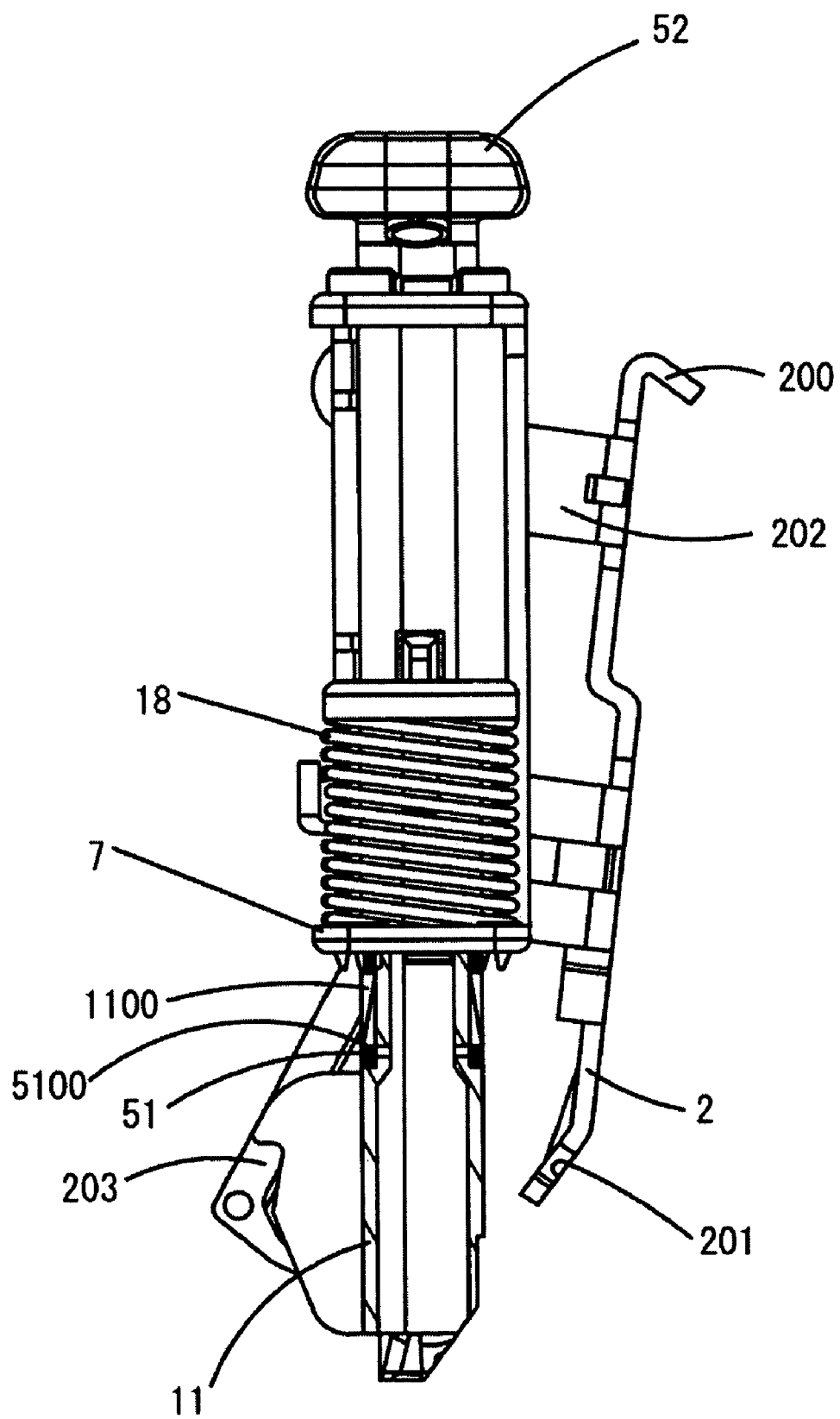
Figures 3, 11:
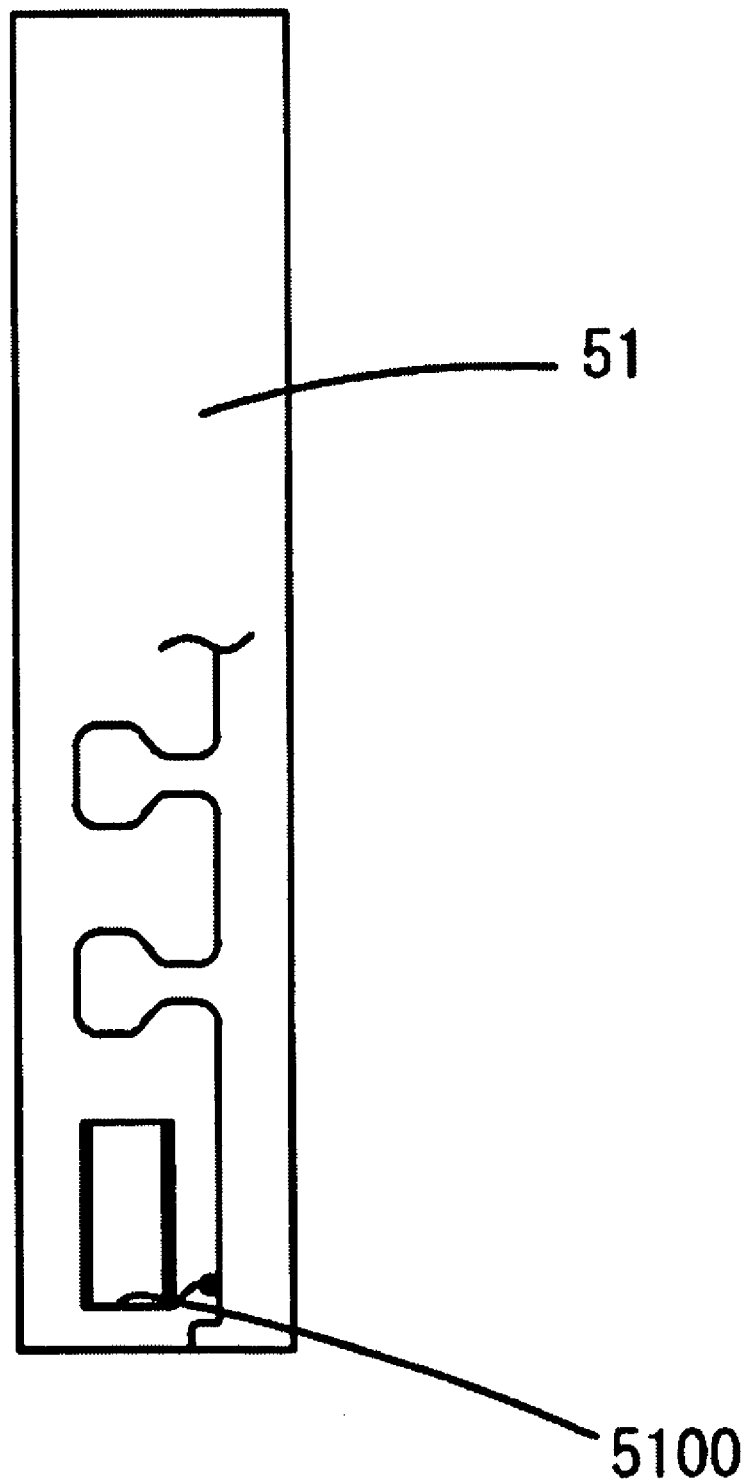

First, the basic structure of the upper unit E is shown in FIGS. 1-3 and 1-4. As individual examples, a first example is shown in FIGS. 2-1-1 to 2-1-5 and 2-2, a second example is shown in FIGS. 3-1-1 to 3-1-5, a third example is shown in FIGS. 4-1-1 and 4-1-2, a fourth example is shown in FIGS. 5-1-1 and 5-1-2, a fifth example is shown in FIGS. 8-1 to 8-2, and a sixth example is shown in FIGS. 9-1 to 9-2. In addition, the fifth example is a modification of the first example.

Now, the basic structure of the upper unit E will be described. The upper unit E is constituted by an upper unit body 2 including a locking portion 200 provided on the back side (at the rear of the seat back A1) provided so as to be locked to or pinch the frame 1, and/or a hole 201 for a stopper to be fastened, brackets 202 provided in a pair (so as to face each other in the width direction of the seat A), a guide piece 203 for forward tilting including a guide hole 203a having a locking stepped portion, a movable body 6 provided so as to be movable between the brackets 202 via a pivot 5, a supporting arm 7 constituted by a pair of (for example, the vertical direction of FIG. 3-1-1) supporting ring arms into which connecting portions (to be described later) of a headrest bracket (to be described later) and/or a lifter (to be described later) respectively provided at both ends of the movable body 6 via the traverse member 7a are inserted, a sheath pipe 8 provided in the upper unit body 2 and substantially door-shaped in front view, a stepped portion 8a provided at a free end of the sheath pipe 8, a body tube portion 8b having a lifter regulating lever 9 provided in the center portion thereof inserted thereinto, grooves 8b1 provided at both ends of the body tube portion 8b, and a hole 802 through which a first wire D provided in a top plate of the body tube portion 8b is inserted. A solenoid 13 (a drive mechanism, such as an actuator or a cylinder) is inserted into the body tube portion 8b of the sheath pipe 8, and a second spring 14 is fitted on an outer peripheral surface of the solenoid. Further, a seating face of the second spring 14 is locked to the stepped portion 8a1 of the sheath pipe 8, and an eaves portion of a lifter guide to be described later.

In addition, the second spring 14 has a lifter guide mounted on the outer peripheral surface thereof at the time of ascent.

A lifter 10 is liftably provided in the upper unit body 2. The lifter 10 includes a lifter body 10a, a pair of lifter guides 12 inserted into the body tube portion 8b of the sheath pipe 8 provided in the lifter body 10a, and connecting portions 11 provided at both ends of the lifter body 10a. As described above, as the lifter 10 ascends, a lifter regulating lever 9 is inserted between the lifter guides 12, the lifter guides 12 themselves contract and advance into the cut grooves 8b1 of the sheath pipe 8, and the second spring 14 locked to the lifter guide 12 is mounted on a body portion of the lifter guides 12. In addition, the longitudinal shape of a body 12c of the lifter guide 12 has a structure such that the body expands (not shown) downward to be helpful to improve strength and/or elasticity and cooperate with and/or regulate the second spring 14, for example.

In addition, with an end face of a lower end locking portion 9a of the lifter regulating rod 9 as a annular insert body 900 (annular inclined insert body 900a), the annular insert body 900 is constructed such that the end face of an upper end locking portion 12a of the lifter guide 12 is slidingly provided at an annular receiving body 1200 (annular inclined receiving body 1200a). In addition, on the upper end locking portion 12a of the lifter guide 12, as shown in FIGS. 2-1-2, 2-1-3, and so on, an eaves portion 1201 is formed in the shape of a beak in sectional view, and a locking projection R is formed. This provides a structure to assist in return of the second spring 14 by the formed beak and prevention of separation of the second spring 14 by the locking projection. In addition, in FIGS. 2-1-4, 2-1-5, and so on, a preferable example of the relationship between the lower end locking portion 9a of the lifter regulating lever 9, and the upper end locking portion 12a of the lifter guide 12 (for example, an example for achieving ease of contraction of the lifter regulating lever 9, securement of elevating/lowering of the lifter regulating lever 9, securement of the durability of individual parts, facilitation of manufacture, etc.) will described. FIG. 2-1-4 shows a structure in which the lower end locking portion 9a of the lifter regulating lever 9, and the upper end locking portion 12a of the lifter guides 12 come into inclined contact with each other (the annular inclined insert body 900a and the annular inclined receiving body 1200a). Further, FIG. 2-1-5 shows a structure in which the lower end locking portion 9a of the lifter regulating lever 9 and the upper end locking portion 12a of the lifter guides 12 come into vertical contact with each other (the annular insert body 900 and annular receiving body 1200). The aforementioned examples are preferable examples, and if the same effects are exhibited, the invention is not limited to these illustrated examples. Further, FIG. 8-1 and so on show a structure in which a receiving portion 1202 is provided at the free end 12b of the lifter guides 12, a protruding portion 1203 is provided inside the receiving portion 1202, the second spring 14 mounted to be wound around the body tube portion 8b is caught by the receiving portion 1202, and the protruding portion 1203 slides on the outer peripheral surface of the second spring 14. Further, the solenoid 13 has a structure to attract or to separate a guiding solenoid 1300.

Hereinafter, individual examples will be described. A first example (FIGS. 2-1-1 to 2-2) is a structure in which a third spring 16 is provided between the solenoid 13 and the lifter regulating lever 9. If the solenoid 13 is demagnetized by detection of the collision sensor G, the lower end locking portion 9a of the lifter regulating lever 9 contracts and/or the lifter guide 12 advances into the cut groove 8b1 of the body tube portion 8b via the third spring 16. In this case, the third spring 16 assists in the ascent of the lifter guide 12, thereby allowing smooth and instantaneous ascent, and the lifter 10 and/or the connecting portion 11 ascends through this ascent.

Then, the ascent of the connecting portion 11 pushes up the headrest bracket ("headrest support" to be described later) of the headrest device H, and as a result, the headrest H1 ascends. Since the example of FIG. 2-2 secures easiness of contraction and/or elevation (movement) of the lower end locking portion 9a of the lifter regulating lever 9, it is possible to provide the bottom portion 9a1 with a recess, and to form the bottom portion 9a1 in the shape of a V-shaped recess like the example of FIG. 2-1-1.

Further, a second example (FIGS. 3-1-1 to 3-1-5) is a structure in which the third spring 16 is provided between the lifter regulating lever 9 and the lifter 10 (bottom portion of the lifter guide 12). If the solenoid 13 is demagnetized by detection of the collision sensor G, the lower end locking portion 9a of the lifter regulating lever 9 contracts and/or the lifter guide 12 advances into the cut groove 8b1 of the body tube portion 8b via the third spring 16. In this case, the third spring 16 assists in the ascent of the lifter guide 12, thereby allowing smooth and instantaneous ascent, and the lifter 10 and/or the connecting portion 11 ascends through this ascent. Then, the ascent of the connecting portion 11 pushes up the headrest bracket of the headrest device H, and as a result, the headrest H1 ascends.

Moreover, a third example (FIGS. 4-1-1 to 4-1-2) is a structure in which the second wire 17 is locked to the lifter 10 (bottom portion of the lifter guide 12), and is a structure in which, if the solenoid 13 is demagnetized by detection of the collision sensor G, the lower end locking portion 9a of the lifter regulating lever 9 contracts and the lifter guide 12 is forced to advance into the cut groove 8b1 of the body tube portion 8b or ascend by pulling of the second wire 17, thereby allowing reliable and instantaneous ascent, and the lifter 10 and/or the connecting portion 11 ascends through this ascent. Then, the ascent of the connecting portion 11 pushes up the headrest bracket of the headrest device H, and as a result, the headrest H1 ascends. The other constructions are based on the aforementioned second example.

Further, a fourth example (FIGS. 5-1-1 to 5-1-2) is a structure which is based on the use of a solenoid 13 which is different from the solenoid used in the first to third example, and in which the lifter regulating lever 9 is movably provided in the inner connecting portion 8b2 of the sheath pipe 8, and a pair of third springs 16 and 16 and a second wire 17 are locked to the lifter 10 (bottom portion of the lifter guide 12), and is a structure in which when the lower end locking portion 9a of the lifter regulating lever 9 detects the collision sensor G attached to a vehicle, the lifter guide 12 is forced to advance into the cut groove 8b1 of the body tube portion 8b or ascend through pulling of the second wire 17, thereby allowing reliable and instantaneous ascent, and the lifter 10 and/or the connecting portion 11 ascends through this ascent. Then, the ascent of the connecting portion 11 pushes up the headrest bracket of the headrest device H, and as a result, the headrest H1 ascends. The other constructions are based on the aforementioned second example.

In addition, in a fifth example (FIGS. 8-1 to 8-2), the solenoid 13 is provided to separate from or attract to a guiding solenoid 1300, and the free end 12b of the lifter guide 12 is expanded, whereby the lifter guide 12 and/or the lifter 10 ascend by the first wire D, and the connecting portion 11 of the lifter 10 ascends, and through this ascent, the headrest bracket of the headrest device H is pushed up. As a result of this push-up, the headrest H1 ascends. The other constructions are based on the aforementioned second example. Further a sixth example is based on the aforementioned first to fifth examples. In the sixth example, the lifter 10 is elevated/lowered by the wire 17, without a solenoid.

In addition, as the lifter 10 ascends, the lifter 10 and its connecting portion 11 move towards the front of the seat back A1 (the advance direction of a vehicle). If the connecting portion 11 is movable, the headrest bracket linked to the connecting portion 11 can move, and according to this movement, the supporting arm 7 can move with the pivot 5 as a fulcrum. The forward tilting of the headrest H1 is secured through the movement of each process described above.

Since the aforementioned ascent and forward tilting proceed simultaneously, and are performed instantaneously, the ascent and forward tilting (ascent and forward tilting) of the headrest H1 are achieved reliably. Thus, there is a feature which an impact against a neck and/or a head can be reliably received, and damage to the neck and/or the head can be avoided.

Next, the operation of the upper unit E will be described. First, if the solenoid 13 is demagnetized in response to the collision sensor G, the lower end locking portion 9a of the lifter regulating lever 9 contracts, and/or the lifter guide 12 advances into the cut groove 8b1 of the body tube portion 8b via the third spring 16, and/or the third spring 16 assists in the ascent of the lifter guide 12, and ascends smoothly and instantaneously. Through this ascent, the lifter 10 and/or the connecting portion 11 ascends, the connecting portion 11 sequentially ascends inside the supporting ring of the supporting arm 7, and the headrest bracket ("headrest support" to be described later) of the headrest device H is pushed up. As a result, the headrest H1 ascends (arrow II in FIGS. 1-4).

Then, along with the ascent of the lifter 10, the guide pins 204 provided at both ends 10a of the lifter 10 ascend along the inclined hole 203a of the guide piece 203, and thereby, the lifter 10, and its connecting portion 11 can move toward the front the seat back A1 (the advance direction of a vehicle).

Then, if the connecting portion 11 is movable, the headrest bracket linked to the connecting portion 11 can move, and according to this movement, the supporting arm 7 can move with the pivot 5 as a fulcrum (arrow III in FIGS. 1-4). The forward tilting of the headrest H1 is secured through the movement of each process described above.

Since the aforementioned ascent and forward tilting proceed simultaneously, and are performed instantaneously, the ascent and forward tilting of the headrest H1 are achieved reliably. Thus, there is a feature which an impact against a neck and/or a head can be reliably received, and damage to the neck and/or the head can be avoided.

In addition, if the headrest H1 descends (return to a first state), a headrest support 52 is pressed and/or a headrest stay 53 is sandwiched by, for examples at least two fingers L, and the headrest H1 is forcibly pressed. By this pressing operation, a check plate 202a locked to a headrest bracket 51 is pressed downwards and the first spring 3 is contracted. Further, the lifter 10 descends due to the ascent of the solenoid 13 by the tension of the first wire D and/or the repulsion of the third spring 16.

Now, the lower unit C will be described in detail.

Figures 1, 6:
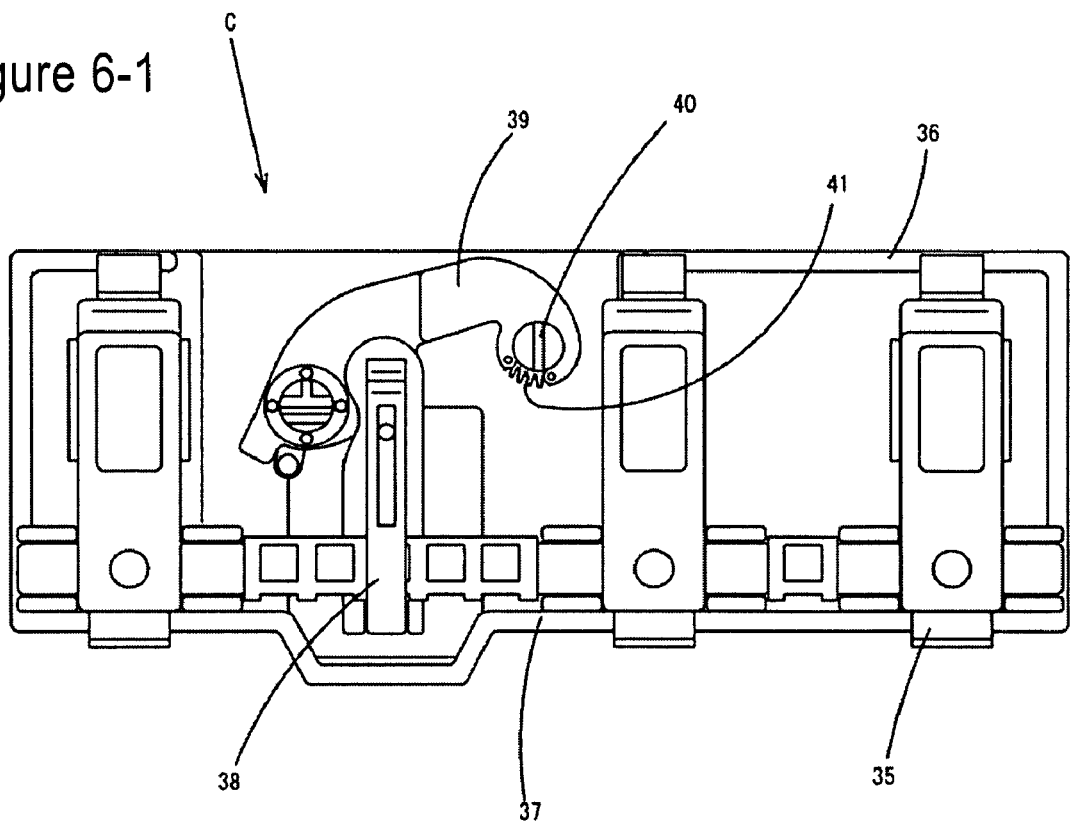
Figures 2, 6:
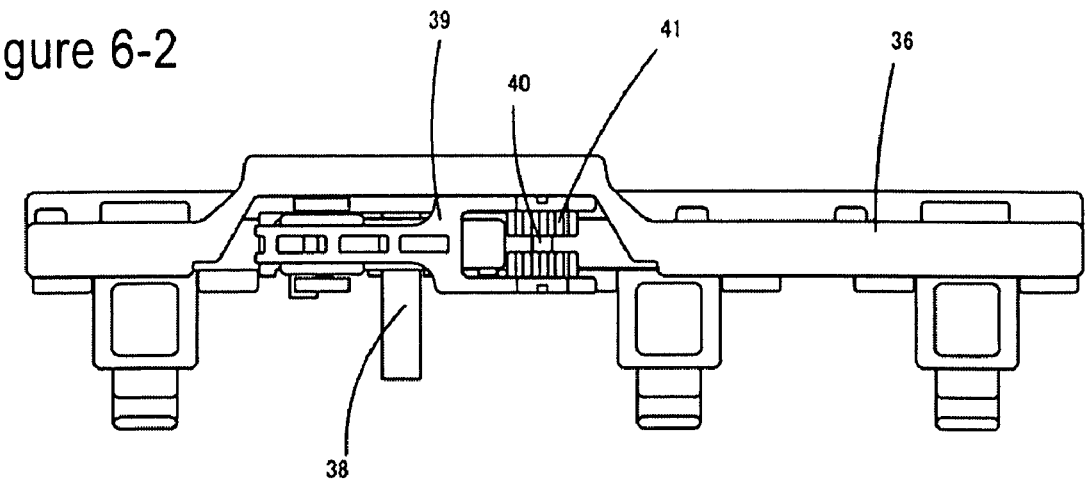
Figures 1, 7:
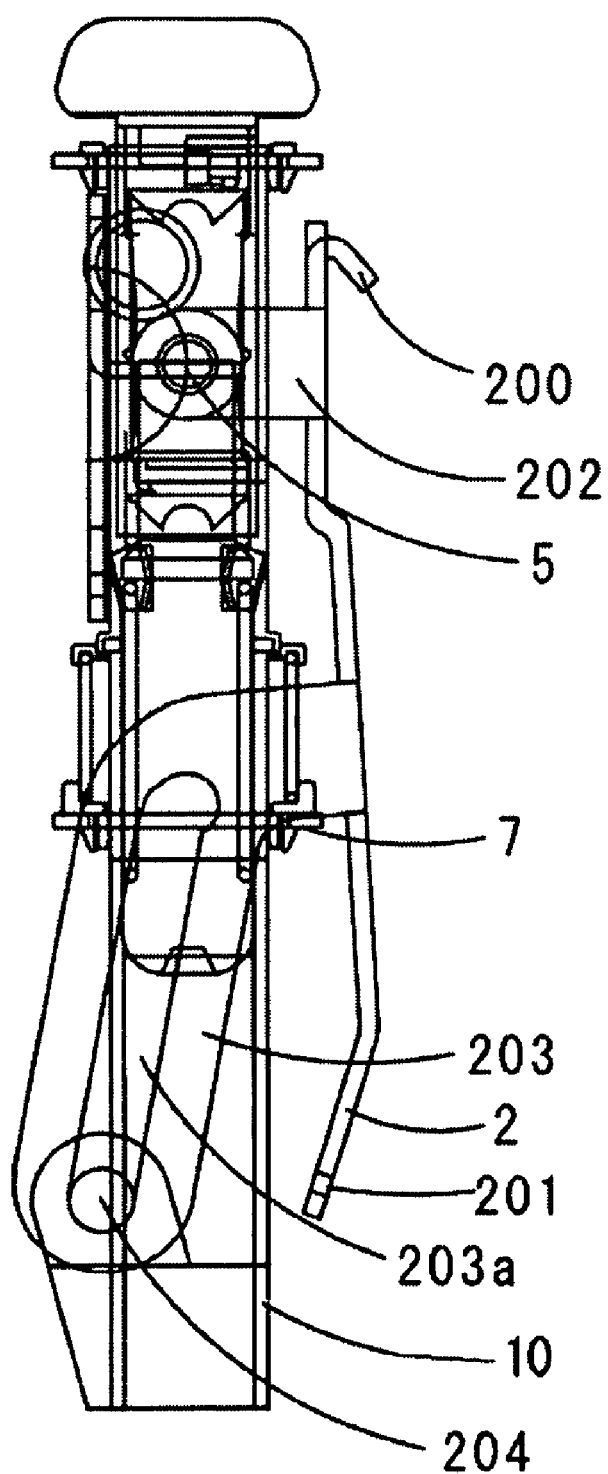

The lower unit C is shown, for example, in FIG. 6-1 and FIG. 6-2.

First, the example of FIGS. 6-1 and FIG. 6-2 is constituted by a lower unit body 36 attached to the frame 1 and/or an intermediate member 100 (called the frame 1), a lower unit movable body 37 pivotally mounted on the lower unit body 36, a cam plate 38 provided in the lower unit movable body 37, an operating arm 39 rocked by the cam plate 38, a supporting ring 35 locked to a fourth spring 18 provided in the seat A and provided in the lower unit body 36, and a winding body 41 in which the first wire D capable of being adjusted and rotated via a pivot 40 is locked to the operating arm 39. If the lower unit movable body 37 is operated by detection (including person's pressing) of the collision sensor G (if the fourth spring 18 is pressed), the cam plate 38 operates, and the operating arm 39 moves, whereby the first wire D is pulled in the direction of the arrow I in FIGS. 1-3. By this pulling, the lifter 10 ascends as mentioned above. The ascent of the lifter 10 can also be made in combination with the solenoid 13. Accordingly, any of the first wire D and the solenoid 13 operates, and the ascent and forward tilting of the headrest H1 is reliably achieved. Thus, there are features of reliability and accuracy of the operation or there is a feature that it is possible to allow for the failure of any of the first wire D and the solenoid 13. In this example, the length and/or tension of the first wire D are adjusted through rotation of the winding body 41. In addition, this lower unit C is an example, and is not limited like other structures, such as a solenoid mechanism and a cam mechanism. In addition, a non-illustrated example includes a relationship between the lower unit C, and another collision sensor. This example relates to a structure in which the actuator operates by a command of a controller, and the lower unit body 36 is pressed.

Next, the headrest device H will be described with reference to FIGS. 1-2 to 9-2 and FIGS. 11-1 to 11-3.

This headrest device is constituted by a headrest bracket 51 having a lower end linked to the connecting portion 11 of the lifter 10 of the upper unit E, and having a portion liftably provided in a supporting ring of the supporting arm 7 via a seal bearing 50 (a seal-shaped bearing used as a guide of the connecting portion 11 during ascent) having a portion having easy lubricity, a headrest support 52 inserted into the headrest bracket 51, a headrest stay 53 provided in the headrest support 52, and a headrest H1 provided in the headrest stay 53. This headrest support 52 and/or the headrest H1 adopt general-purpose products, which contribute to sharing and/or modularization of parts. It is effective in the stability and mobility of the headrest H1 that the headrest bracket 51 has at least a length covering the upper and lower portions of the supporting arm 7 during the descent thereof. Reference numeral 3 in the drawings is a first spring interposed between the supporting ring of the supporting arm 7, and the check plate 202a of a headrest bracket 51. The first spring 3 has the structure of resiliently supporting the headrest bracket 51 and of resiliently supporting the position of the headrest bracket 51 during ascent. In addition, the seal bearing 50 includes a lower piece 5000 having flexibility, and has the structure of resiliently supporting the headrest bracket 51 and/or of securing the connecting portion 11, and the mobility and adhesion of the headrest bracket 51, etc. Also, a gap is provided between the headrest brackets 51, and the lower piece 5000 is free. Further, in order to allow the headrest bracket 51 and/or the headrest support 52 to be mounted on the connecting portion 11 of the lifter 10 of the upper unit E, one or more claw pieces 1100 are formed on the connecting portion 11, and one or more long holes 5100 into which the claw pieces 1100 are fitted and locked are provided at the lower end of the headrest bracket 51. Also, this long hole 5100 is formed in a position shifted from the center, as a result of finishing this headrest bracket 51 in clinch structure (this is merely an example). Accordingly, when the headrest bracket 51 and/or headrest support 52 are inserted from the opening toward the lifter 10 mounted into the seat A, the claw piece 1100 is sequentially pressed by the lower end of the headrest bracket 51, and the claw piece 1100 becomes substantially flush with the outer peripheral surface of the connecting portion 11. Then, when the long hole 5100 of the headrest bracket 51 arrives at the claw piece 1100, the claw piece 1100 enters the long hole 5100, and simultaneously the pressing to the claw piece 1100 is released. Thus, this claw piece 1100 returns to its initial state. Both axial ends of the long hole 5100 are locked to the rear face of the claw piece 1100 at its free end, and the front face of a base end thereof.

Through this vertical locking, the lifter 10, the headrest bracket 51, and/or the headrest support 52 are integrally mounted. In addition, although the structure in which both axial ends of the long hole 5100 are locked to the rear face of the claw piece 1100 at its free end, and the front face of a base end thereof has been described, this is merely an example, and the invention is not limited thereto.

As for the operation of the headrest, as mentioned above, the headrest will be in a raised state as the headrest bracket 51 is pushed up by the ascent of the lifter 10 or the connecting portion 11 of the upper unit E with the supporting arm 7 as a guide. The details of this ascent state are those of the aforementioned upper unit E, and the ascent and forward tilting of this headrest H1 are reliably achieved.

The effects of the headrest are also as mentioned above.

Figure 12:
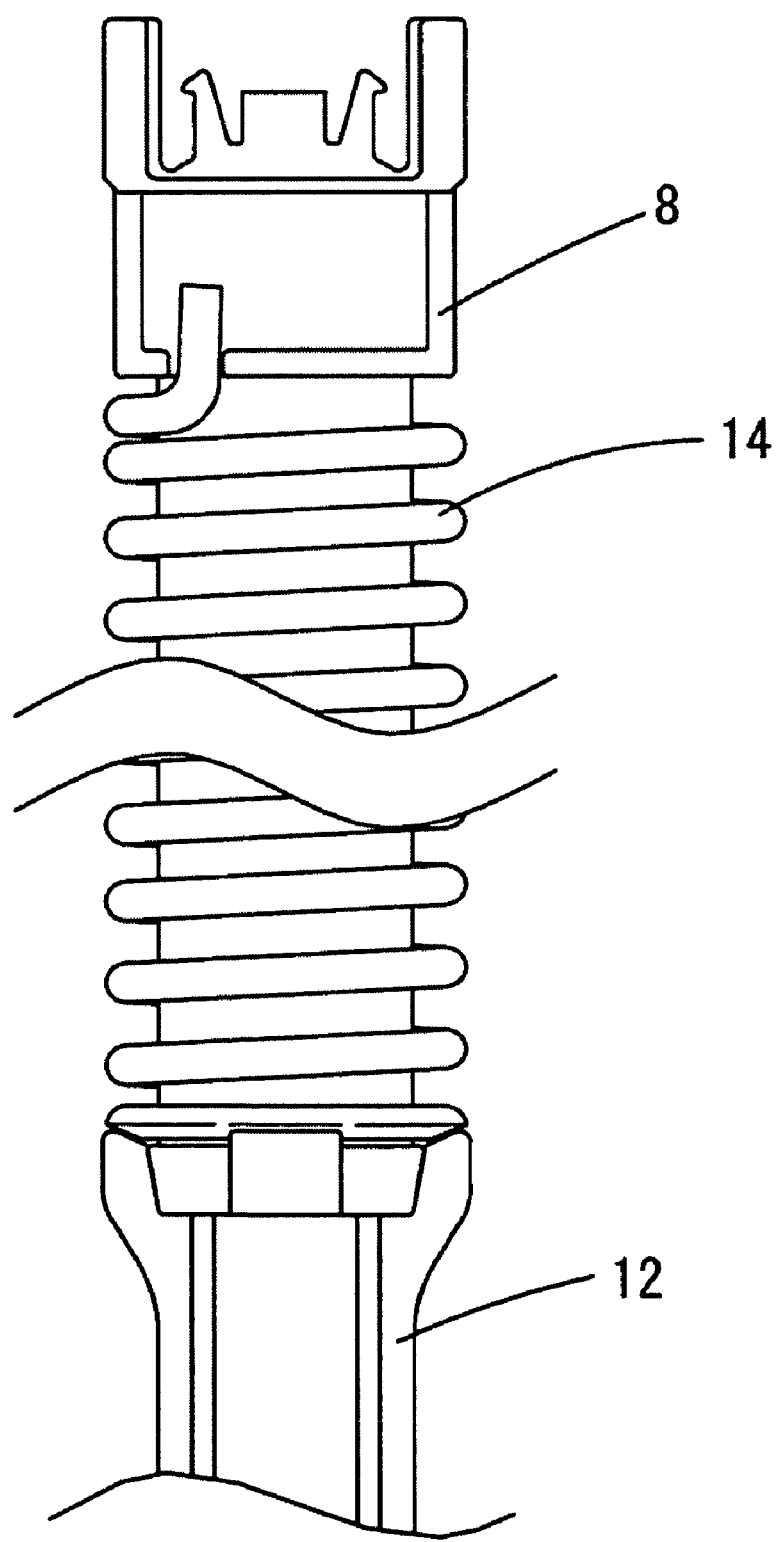
FIG. 12 is an enlarged front view of chief parts showing the relationship between a sheath pipe, a second spring and a lifter guide.

FIG. 12 shows the relationship between the second spring 14 mounted to be wound around the sheath pipe 8, and the lifter guide 12. Here, bounding of the second spring 14 is avoided, deviation of the lifter 10 and/or the lifter guides 12 is prevented, or radial enlargement (escape) of the second spring 14 is prevented. In this example, an upper seating face is locked into a groove of an upper portion of the sheath pipe 8, and a lower seating face (notched flat portion) is locked to a locking inclined surface of the second spring 14. This structure allows automatic assembling (although description is omitted, the other structures are all the same).

Figures 13, 14:
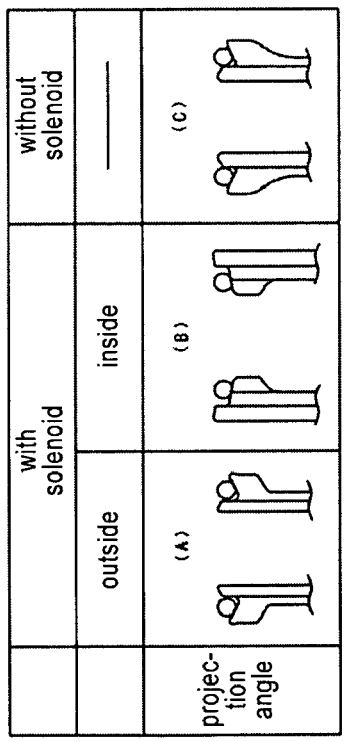
FIG. 13 is a view showing the relationship between a solenoid and the second spring and/or individual examples of combinations thereof.
FIG. 14 is a view showing the relationship between a solenoid, the first spring and a collision sensor and/or individual examples of combinations thereof.

In addition, (A) to (C) of FIG. 13 shows the relationship among the solenoid 13, the upper end locking portion 12a of the lifter guides 12, and the second spring 14. Here, the angle of the end locking portion 12a conforms to the movement of the second spring 14. (A) shows a structure in which the second spring 14 applies a pressure in the direction of inner diameter, (B) shows a structure in which slipping of the second spring 14 is guaranteed, and the spread of the upper end locking portion 12a of the lifter guide 12 is guaranteed, and (C) shows a structure with no solenoid 13, shows the relationship between the upper end locking portion 12a of the lifter guide 12 and the second spring 14, and is based on the above (A).

FIG. 14 shows individual examples of the relationship and/or combinations of the first wire D, and the collision sensor G or the solenoid 13, and shows examples of combinations in the first to sixth examples. Here, even if a trouble is caused in the lower unit C due to a failure, etc., the ascent and forward tilting of the headrest H1 can be reliably achieved by the operation of the solenoid 13 and the collision sensor G.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

I claim:

1. A headrest device for an active headrest, comprising:
an ascent/forward tilting mechanism which performs upward ascent movement and forward tilting, in an advance direction of a vehicle, of the headrest, said ascent/forward titling mechanism including:

an upper unit provided in a seat including:
  a substantially rectangular upper unit body;
  supporting arms supporting headrest brackets pivotally mounted on said upper unit body;
  a sheath pipe vertically provided at the center of said upper unit body, said sheath pipe having a generally tubular structure;
  a lifter capable of elevation and forward tilting, said lifter including a lifter guide movable into or out of said sheath pipe, and a connecting portion vertically provided at both ends of said lifter and locked to said headrest brackets;
  a lifter regulating lever which elevates and lowers within said sheath pipe; and
  a pulley provided in an upper portion of said upper unit body,
a first wire having a first end linked to said lifter;
a lower unit linked to a second end of said first wire and provided in the seat, said lower unit including:
  a lower unit movable body;
  a cam plate pivotally mounted on said lower unit; and
  an operating arm,
a locking/unlocking device provided in the vehicle to unlock/lock said first wire, said locking/unlocking device including a collision sensor provided in the vehicle and at least one of a solenoid or a fastening mechanism, and
a headrest device which is ascended and tilted forward by said ascent/forward tilting mechanism, said headrest device including:
  said headrest brackets provided in said upper unit;
  a headrest support fitted into said headrest brackets;
  a headrest stay loosely fitted into said headrest support; and
  a headrest provided on said headrest stay,
wherein said lifter is operated via said first wire to cause ascent and forward tilting of said headrest brackets and said headrest.

2. The headrest device for the active headrest according to claim 1,
wherein said locking/unlocking device includes said solenoid, built into said sheath pipe of said upper unit to control said lifter guide, and a spring fitted on said sheath pipe.

3. The headrest device for the active headrest according to claim 1,
wherein said locking/unlocking device includes said solenoid, and
wherein said sheath pipe and said lifter guide are linked by said solenoid movably provided in said sheath pipe and having said first wire locked thereto, a spring provided between said sheath pipe and said lifter guide, an eaves portion provided in an upper portion of said lifter guide on which said spring is retained, and a cut groove provided in said sheath pipe into which said lifter guide is inserted.

4. The headrest device for the active headrest according to claim 1,
wherein said locking/unlocking device includes said solenoid, and
wherein said sheath pipe and said lifter guide are linked by said solenoid movably provided in said sheath pipe and having a second wire obtained by extending the first wire locked thereto, a spring provided between said sheath pipe and said lifter guide, an eaves portion provided in an upper portion of said lifter guide in which said spring is retained, and a cut groove provided in said sheath pipe into which said lifter guide is inserted.

5. The headrest device for the active headrest according to claim 1,
wherein one or more long holes are formed in said headrest brackets,
wherein one or more claw pieces are formed in said connecting portion on the outer face thereof, and
wherein said claw piece are fitted into and locked to said long hole in order to fit said headrest brackets on said connecting portion.

6. The headrest device for the active headrest according to claim 1,
wherein said locking/unlocking device includes said solenoid,
wherein said locking/unlocking device further comprises a guiding solenoid, and
wherein either said solenoid or said guiding solenoid is accommodated in said sheath pipe, and said guiding solenoid being adapted to return to its initial position through tension operation of said first wire.

7. The headrest device for the active headrest according to claim 1,
wherein said lifter regulating lever has an annular insert body at a lower end locking portion thereof, and
wherein said lifter guide includes an annular receiving body provided at an upper end locking portion thereof.

8. The headrest device for the active headrest according to claim 1,
wherein said lifter guide is located outside said spring and said sheath pipe, and said lifter guide is adapted to move along the outside of said spring.

9. The headrest device for the active headrest according to claim 1,
wherein said lower unit movable body is pivotally mounted on said lower unit body,
wherein said cam plate is provided in said lower unit movable body,
wherein said operating arm is rocked by said cam plate,
wherein said lower unit further includes a supporting ring locked to a spring provided in the seat, said supporting ring being provided in said lower unit body, and
wherein said lower unit further comprises a winding body which is capable of adjusting and rotating said first wire via a pivot, said winding body being locked to said operating arm.

10. The headrest device for the active headrest according to claim 1,
wherein length adjustment of said first wire is performed by said lower unit.

11. The headrest device for the active headrest according to claim 1,
wherein said upper unit is adapted to operate via said collision sensor provided in the vehicle.

* * * * *